US012198687B2

(12) United States Patent
Kang et al.

(10) Patent No.: US 12,198,687 B2
(45) Date of Patent: Jan. 14, 2025

(54) SYSTEM FOR PROCESSING USER UTTERANCE AND CONTROL METHOD THEREOF

(71) Applicant: Samsung Electronics Co., Ltd., Suwon-si (KR)

(72) Inventors: Doosuk Kang, Suwon-si (KR); Seungnyun Kim, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 936 days.

(21) Appl. No.: 17/047,517

(22) PCT Filed: May 9, 2019

(86) PCT No.: PCT/KR2019/005532
§ 371 (c)(1),
(2) Date: Oct. 14, 2020

(87) PCT Pub. No.: WO2019/221440
PCT Pub. Date: Nov. 21, 2019

(65) Prior Publication Data
US 2021/0151052 A1 May 20, 2021

(30) Foreign Application Priority Data
May 14, 2018 (KR) .................. 10-2018-0054964

(51) Int. Cl.
G10L 15/22 (2006.01)
G06F 3/16 (2006.01)
(Continued)

(52) U.S. Cl.
CPC .............. G10L 15/22 (2013.01); G06F 3/167 (2013.01); G10L 15/18 (2013.01); H04L 67/75 (2022.05); H04W 4/80 (2018.02)

(58) Field of Classification Search
CPC ..... G10L 15/22; G10L 15/18; G10L 15/1822; G10L 15/28; G10L 15/04; G06F 3/167; H04L 67/75; H04W 4/80
See application file for complete search history.

(56) References Cited

U.S. PATENT DOCUMENTS 10,950,228 B1 * 3/2021 Tan .................... G06F 3/167
2014/0145873 A1 * 5/2014 Miller ................ G01S 5/02524
342/146

(Continued)

FOREIGN PATENT DOCUMENTS

JP 4503310 B2 7/2010
JP 5718419 B2 5/2015
(Continued)

OTHER PUBLICATIONS

Korean Office Action Apr. 24, 2024, issued in Korean Application No. 10-2018-0054964.
(Continued)

Primary Examiner — Michael N Opsasnick
(74) Attorney, Agent, or Firm — Jefferson IP Law, LLP

(57) ABSTRACT

Disclosed is an electronic device an electromagnetic (EM) sensing circuit for receiving an EM signal, and a processor operationally connected to the EM sensing circuit, wherein the processor is configured to obtain an user, activate, if the user input does not contain information specifying a target device, the EM sensing circuit, receive an EM signal from the target device, specify the information about the target device using an artificial intelligence model, and transmit input data based on the user input and the information about the target device so that the target device operates in response to the user input, and wherein the electronic device and the target device are registered with the same user account in the intelligence server, and the electronic device (Continued)

receives a path rule from the intelligence server and controls the target device so that the target device operates based on the path rule.

9 Claims, 23 Drawing Sheets

(51) Int. Cl.
*G10L 15/18* (2013.01)
*H04L 67/75* (2022.01)
*H04W 4/80* (2018.01)

(56) References Cited

U.S. PATENT DOCUMENTS

| | | | |
|---|---|---|---|
| 2015/0070181 A1* | 3/2015 | Fadell | G08B 21/22 340/628 |
| 2016/0005281 A1* | 1/2016 | Laska | G08B 13/1961 348/143 |
| 2016/0059412 A1* | 3/2016 | Oleynik | B25J 19/02 700/250 |
| 2017/0025124 A1* | 1/2017 | Mixter | G10L 15/22 |
| 2017/0124816 A1 | 5/2017 | Yang et al. | |
| 2017/0270198 A1 | 9/2017 | Sample et al. | |
| 2017/0345420 A1* | 11/2017 | Barnett, Jr. | G10L 15/1815 |
| 2017/0352352 A1* | 12/2017 | Wang | G06F 3/167 |
| 2018/0001184 A1* | 1/2018 | Tran | G16H 50/20 |
| 2018/0061419 A1* | 3/2018 | Melendo Casado | G10L 25/78 |
| 2018/0096690 A1* | 4/2018 | Mixter | G10L 21/0216 |
| 2019/0037642 A1* | 1/2019 | Price | H04W 92/18 |
| 2020/0365159 A1 | 11/2020 | Casado et al. | |
| 2022/0199090 A1 | 6/2022 | Casado et al. | |
| 2024/0153507 A1 | 5/2024 | Casado et al. | |

FOREIGN PATENT DOCUMENTS

| | | |
|---|---|---|
| JP | 2017-046295 A | 3/2017 |
| KR | 10-1556173 B1 | 9/2015 |
| KR | 10-2017-0081390 A | 7/2017 |
| KR | 10-2018-0045037 A | 5/2018 |

OTHER PUBLICATIONS

Rejection Decision dated Oct. 2, 2024, issued in Korean Application No. 10-2018-0054964.

* cited by examiner

SYSTEM FOR PROCESSING USER UTTERANCE AND CONTROL METHOD THEREOF

TECHNICAL FIELD

Various embodiments of the present disclosure relate to a technology of processing a user utterance.

BACKGROUND ART

Recent electronic devices may support various input methods such as voice input in addition to input through a keyboard, mouse, or touch. For example, electronic devices such as smartphones or tablets provide a service for receiving a user's speech and executing an operation corresponding to the input user's speech.

Such a speech recognition service is developed based on a technology of processing a natural language. According to the technology of processing a natural language, an intent of a user utterance is recognized, and a result matching the intent may be calculated to provide a service to the user.

Due to a variety of services to be provided, electronic devices may process a user utterance via a server to provide a specified service corresponding to the user utterance. The server may include a database and an artificial intelligence (AI) system for processing user utterances to analyze user utterances more accurately compared to electronic devices. Furthermore, electronic devices may control an external electronic device, which is one of surrounding other electronic devices, so that the external electronic device may perform an operation corresponding to a user utterance.

Electronic devices may emit a unique electromagnetic (EM) signal. It may be possible to identify an electronic device using the EM signal generated by the electronic device. For example, it may be possible to use the EM signal to classify products belonging to the same product group manufactured by the same manufacturer by model.

DISCLOSURE OF THE INVENTION

Technical Problem

When controlling a target device through a voice command, an external electronic device for processing a user utterance in response to the voice command should be specified so as to be operated. When an external electronic device is not specified in a user utterance, an electronic device is able to perform some of operations but is not able to perform the remaining operations. Alternatively, when an external electronic device is not specified in a user utterance, the electronic device may guide a user to specify a target device. To this end, the electronic device may request the user to provide an additional utterance or input so as to specify a target device among external electronic devices. Therefore, since the user is required to specify a target device, the convenience of the user may deteriorate. Furthermore, since the target device is unable to perform an operation while the user is specifying the target device through an additional utterance, operation of the target device may be delayed.

Various embodiments of the present disclosure provide a system, which specifies a target device and operates the target device according to contents of a command even when a target device for performing an operation is not specified in a user utterance.

Technical Solution

An electronic device according to an embodiment of the present disclosure includes a display, an input device including a microphone, a communication circuit, an electromagnetic (EM) sensing circuit for receiving an EM signal of at least one external electronic device, and a processor operationally connected to the display, the input device, the communication circuit, and the EM sensing circuit, wherein the processor is configured to obtain a voice input of a user through the microphone, transmit first information about the EM signal received by the EM sensing circuit to a first server via the communication circuit, receive, from the first server, second information specifying a target device among the at least one external electronic device via the communication circuit in response to transmission of the first information, and transmit voice data based on the voice input and the second information to a second server via the communication circuit so that the target device operates in response to the voice input, and wherein the electronic device and the target device are registered with the same user account in the second server, and the electronic device receives a path rule from the second server and controls the target device so that the target device operates based on the path rule.

Furthermore, an electronic device according to another embodiment of the present disclosure includes a communication circuit, a memory, a processor operationally connected to the communication circuit and the memory, and an EM sensing circuit for receiving an EM signal from at least one external electronic device, wherein, when the memory is executed, the processor is connected to an automatic speech recognition (ASR) module and a plurality of natural language understanding modules operating independent of each other, receives a voice input including an utterance of a user via the communication circuit, provides the voice input to the automatic speech recognition module, and receives a response corresponding to contents of the voice input using any one of the plurality of natural language understanding modules, and wherein the processor is configured to transmit, to at least one server, information specifying a target device among the at least one external electronic device using the EM signal received by the EM sensing circuit via the communication circuit, and transmit, to another server different from the at least one server, information inducing the target device to operate based on the voice input via the communication circuit, wherein the electronic device and the target device are registered with the same user account in the at least one server, and the electronic device receives a path rule from the other server and controls the target device so that the target device operates based on the path rule.

Furthermore, a method for an electronic device to control an external electronic device according to an embodiment of the present disclosure includes obtaining a voice input of a user through a microphone, receiving an electromagnetic (EM) signal of at least one external electronic device via an EM sensing circuit, transmitting first information about the EM signal to a first server via a communication circuit, receiving, from the first server, second information specifying a target device among the at least one external electronic device via the communication circuit in response to transmission of the first information, and transmitting voice data based on the voice input and the second information to a second server via the communication circuit so that the target device operates in response to the voice input, wherein the electronic device and the target device are registered with the same user account in the second server, and the electronic device receives a path rule from the second server and controls the target device so that the target device operates based on the path rule.

Advantageous Effects

According to various embodiments of the present disclosure, since a target device is specified using an EM signal, a target device can be specified even if the target device is not specified in a user utterance. Therefore, a step of additionally guiding a user in order to specify a target device may be skipped. Furthermore, since a target device can be specified quickly, the speed of instructing the target device can be increased.

Besides, various effects may be provided that are directly or indirectly identified through various embodiments of the present disclosure.

MODE FOR CARRYING OUT THE INVENTION

Figure 1:
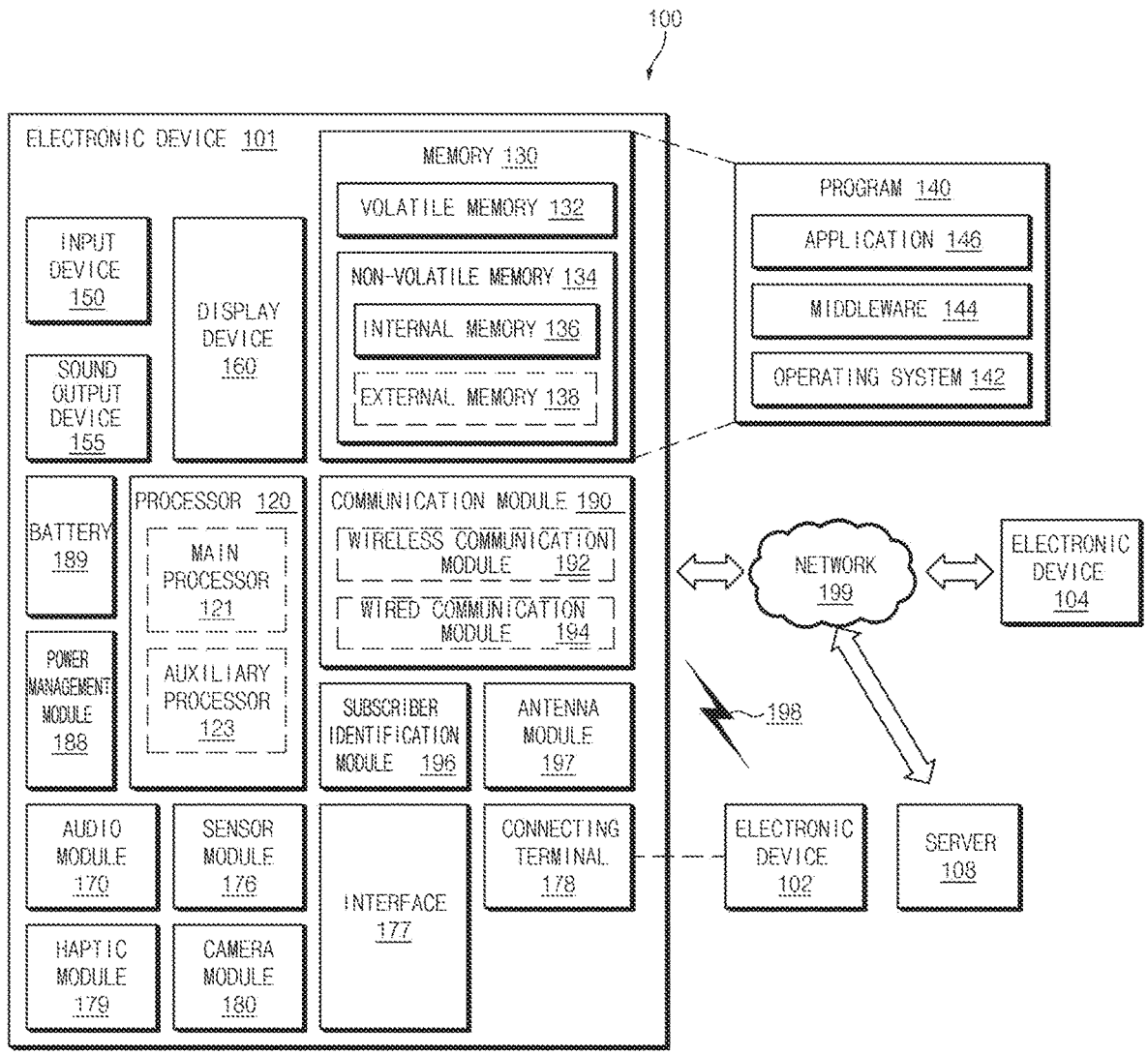
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
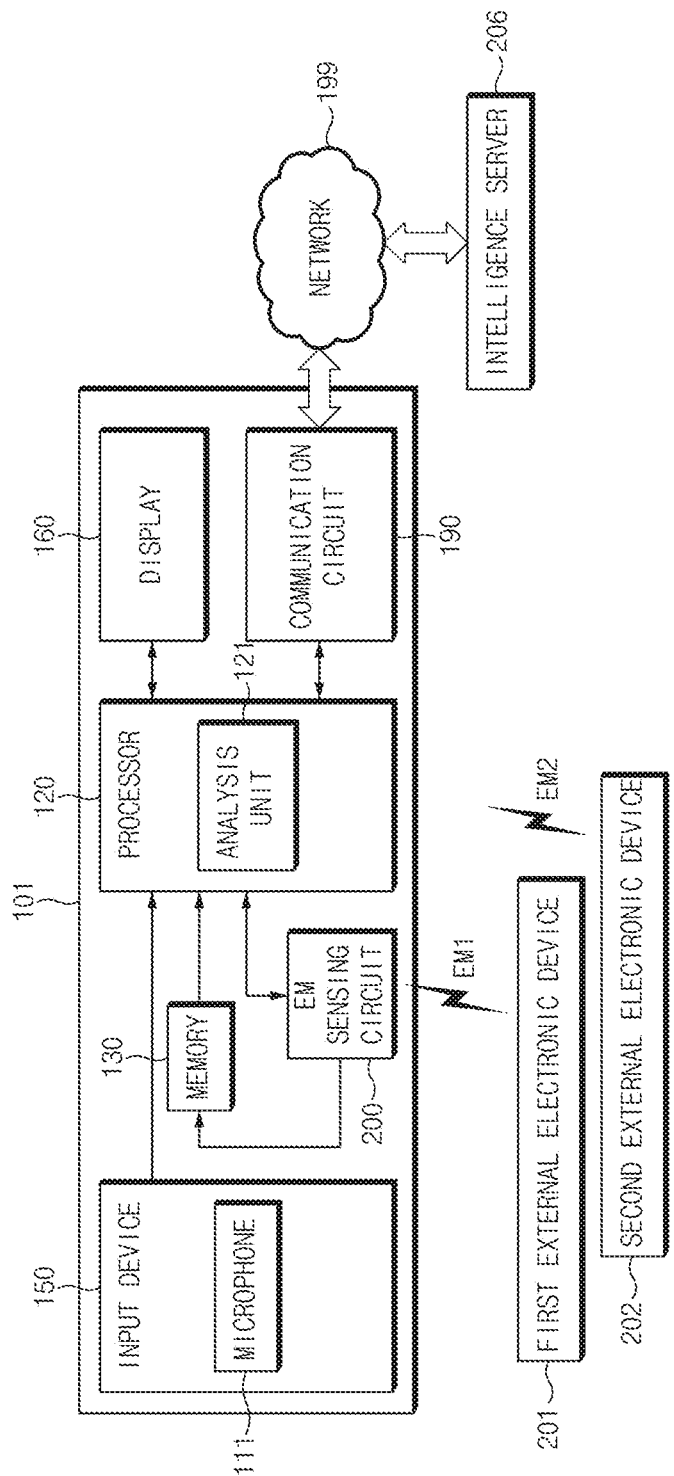
FIG. 2A is a block diagram illustrating an electronic device according to an embodiment.
Figure 2B:
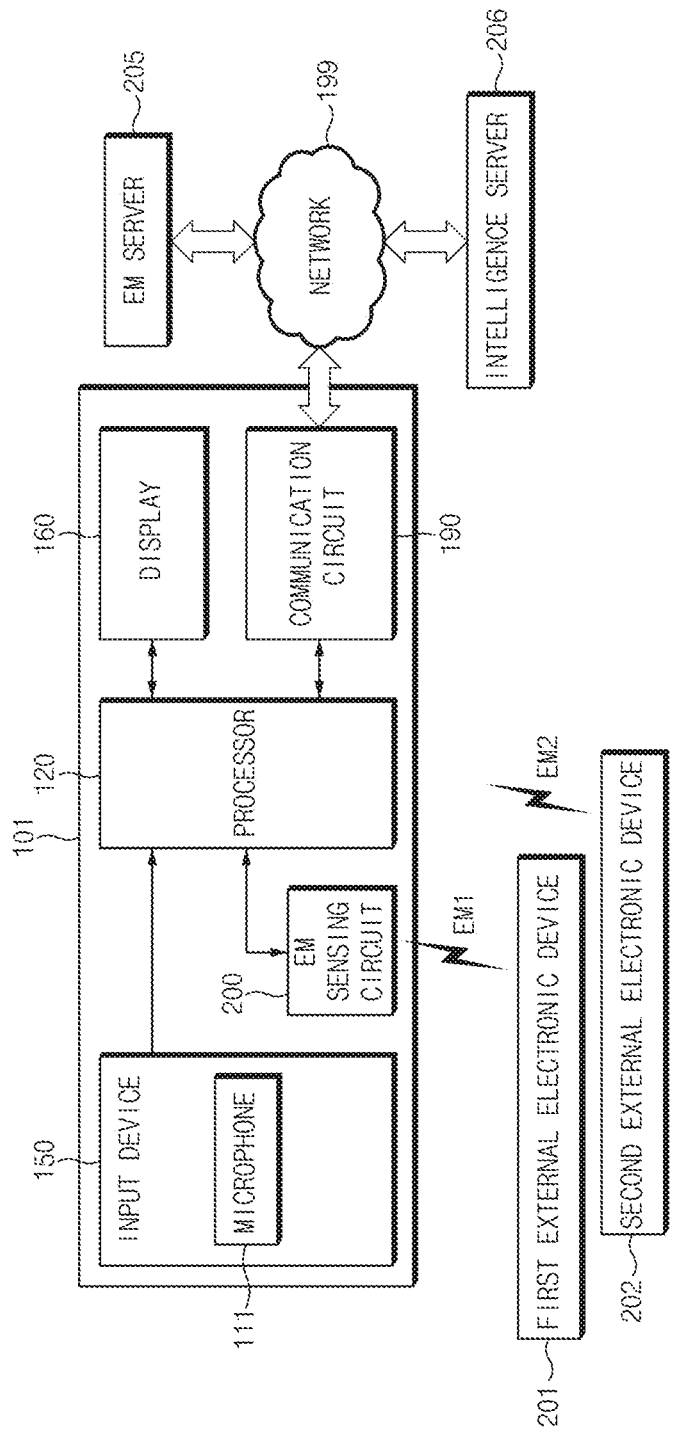
FIG. 2B is a block diagram illustrating an electronic device according to another embodiment.

FIG. 2A is a block diagram illustrating an electronic device 101 according to an embodiment. FIG. 2B is a block diagram illustrating an electronic device 101 according to another embodiment.

The electronic device 101 according to an embodiment may include an input device 150, a display 160, a communication circuit 190, a processor 120, and an EM sensing circuit 200.

The input device 150 may obtain various types of input performed by a user. The input device 150 may receive, from the outside of the electronic device 101, a command or data to be input to the electronic device 101. A user's input may include a touch input, a drag input, or a voice input. The input device 150 according to an embodiment may include a microphone 111. The microphone 111 may obtain a voice input of the user.

The display 160 may display, as an image or text, information about a user's input obtained from the input device 150. For example, the display 160 may display contents of an obtained voice input as text. When the electronic device 101 performs an operation corresponding to an obtained user's input, the display 160 may display an image showing an execution operation of the electronic device 101.

The communication circuit 190 may transmit, via a network 199, information stored in the electronic device 101 to a server (e.g., an EM server 205 or an intelligence server 206). The communication circuit 190 may transmit unique information of the electronic device 101 to the server. For example, the communication circuit 190 may transmit information about a user account of the electronic device 101 to the server. Furthermore, the communication circuit 190 may transmit information generated by the electronic device 101 to the server. For example, when the user has launched and used a mobile game application, the communication circuit 190 may transmit, to the server, information finally stored after the use of the mobile game application. Furthermore, the communication circuit 190 may receive, from the server, information for implementing an operation to be performed by the electronic device 101. For example, when the user launches the mobile game application again, the communication circuit 190 may receive, from the server, information stored until a last execution portion.

The processor 120 may be operationally connected to the display 160. The processor 120 may provide image data so that the display 160 may display an image. The processor 120 may be operationally connected to the input device 150. The processor 120 may analyze a user's input obtained from the input device 150, and may perform a preparation task for implementing an operation according to contents of the input. The processor 120 may be operationally connected to the communication circuit 190. The processor 120 may configure the type and contents of information transmitted/received by the communication circuit 190.

The EM sensing circuit 200 may receive an electromagnetic (EM) signal of at least one external electronic device 201 and 202. According to an embodiment, the EM sensing circuit 200 may generate first information based on the EM signal. For example, first information may include information about a waveform of the EM signal and information about the type of the at least one external electronic device 201 and 202 that has emitted the EM signal. The EM sensing circuit 200 may receive a first EM signal EM1 from a first external electronic device 201, and may generate first information about the first EM signal EM1 using an amplitude and phase of a waveform of the first EM signal EM1. According to an embodiment, the EM sensing circuit 200 may provide the first information about the first EM signal EM1 to the processor 120. The EM sensing circuit 200 may receive a second EM signal EM2 from a second external electronic device 202, and may generate the first information about the second EM signal EM2 using an amplitude and phase of a waveform of the second EM signal EM2. The EM sensing circuit 200 may provide the first information about the second EM signal EM2 to the processor 120.

The EM sensing circuit 200 may be operationally connected to the processor 120. The EM sensing circuit 200 may generate the first information about a plurality of EM signals EM1 and EM2 sensed in response to a control by the processor 120.

According to an embodiment, as illustrated in FIG. 2A, the electronic device 101 may store information related to the external electronic devices 201 and 202 in the EM sensing circuit 200 or a memory 130. The electronic device 101 may analyze the first information based on the information related to the external electronic devices 201 and 202. The processor 120 of the electronic device 101 may include an analysis unit 121 for analyzing the first information.

According to another embodiment, as illustrated in FIG. 2B, the electronic device 101 may transmit the first information generated by the EM sensing circuit 200 to the EM server 205 having information related to the external electronic devices 201 and 202. The electronic device 100 may send at least a portion of the first information to the EM server 205. The EM server 205 may receive the first information. The EM server 205 may analyze the first information based on the information related to the external electronic devices 201 and 202. The EM server 205 may transmit a result of analyzing the first information to the electronic device 101. The electronic device 101 may receive the result of analyzing the first information from the EM server 205 via the communication circuit 190.

According to an embodiment, as illustrated in FIG. 2A, the electronic device 101 may recognize the information related to the external electronic devices 201 and 202 and included in the first information by analyzing the first information. According to another embodiment, as illustrated in FIG. 2B, the electronic device 101 may receive, from the EM server 205, the information related to the external electronic devices 201 and 202 and included in the first information. For example, the first information may include information about the type and model name of the external electronic devices 201 to 202. The electronic device 101 may send the information about the type and model name included in the first information to the EM server 205 to analyze the information, and then the electronic device 101 may receive and confirm analyzed information from the EM server 205. For another example, the first information may include information about an operation state of the external electronic devices 201 and 202 and about whether the external electronic devices 201 and 202 are able to execute a command.

The processor 120 may control so that the first information generated by the EM sensing circuit 200 based on a received EM signal is transmitted to the EM server 205 via the communication circuit 190.

According to an embodiment, the EM server 205 may include information about a plurality of EM signals. The EM server 205 may compare information about an EM signal included in the first information with pre-stored information about a plurality of EM signals. The EM server 205 may analyze which external electronic device the EM signal included in the first information has been output from. In various embodiments of the present disclosure, the EM server 205 may be referred to as a first server.

According to an embodiment, the EM server 205 may use the EM signal included in the first information to specify an external device that has emitted the EM signal. The external device specified by the EM server 205 using the EM signal may be defined as a target device. The target device may be a device that is a target for execution of user's voice input among the external electronic devices 201 and 202. When the electronic device 101 operates according to a user's voice input, the target device may perform an operation corresponding to operation of the electronic device 101 or may respond to operation of the electronic device 101. When the first external electronic device 201 is specified as the target device, the EM server 205 may specify the first external electronic device 201 as a first external device. Alternatively, when the second external electronic device 202 is specified as the target device, the EM server 205 may specify the second external electronic device 202 as the first external device. The EM server 205 may include second information including information specifying the first external device.

According to an embodiment, the EM server 205 may generate the second information in response to transmission of the first information. The EM server 205 may transmit the second information to the electronic device 101. The processor 120 may receive the second information from the EM server 205 via the communication circuit 190. The processor 120 may use the second information to specify the first external device to be controlled to execute a user's voice input.

According to an embodiment, the processor 120 may control the first external device to operate according to contents of a voice input uttered by the user into the microphone 111. Accordingly, the processor 120 may transmit the voice input and the second information to the intelligence server 206 via the communication circuit 190.

The intelligence server 207 may perform natural language processing for converting a text-form natural language into a machine language. The intelligence server 206 may convert a received voice input into text data. The intelligence server 206 may analyze the text data syntactically or semantically to recognize an intent of the user. The intelligence server 206 may generate an operation path by mapping the intent of the user to a specified path rule set. The intelligence server 206 may control the target device and/or the electronic device 101 to operate according to contents of a voice input, i.e., operate according to a sequence of states. In various embodiments of the present disclosure, the intelligence server 206 may be referred to as a second server.

According to an embodiment, the intelligence server 206 may directly control the target device using the second information and information included in a voice input. For example, when a speaker is specified in the second information and a turn-on command is included in the voice input, the intelligence server 206 may transmit a turn-on signal so as to directly turn on the speaker in order to execute a command of turning on the speaker using the voice input and the second information.

According to an embodiment, the intelligence server 206 may provide information for the electronic device 101 to control operation of the target device. For example, when a notebook computer is specified in the second information and a command of transmitting a picture is included in the voice input, the intelligence server 206 may transmit a control signal to the electronic device 101 so as to transmit a picture stored in the electronic device 101 to the notebook computer using the voice input and the second information.

The electronic device 101 and the target device according to an embodiment may be registered with the same user account in the intelligence server 206. The user account of the electronic device 101 may be registered in the intelligence server 206 when the user begins to use the electronic device 101. For example, when the user beings to use the electronic device 101 for the first time, the user account of the electronic device 101 may be generated using an email or registration identification according to a pre-configured system program. Thereafter, while using the electronic device 101, the user may register the target device with the same user account as the user account registered in the intelligence server 206. Alternatively, when beginning to use the target device, the user may use the same user account as the user account of the electronic device 101.

For example, when the electronic device 101 begins to be used, the electronic device 101 may search for surrounding home appliances (e.g., electronic devices supporting short-range communication) such as TV, notebook computer, lighting, heating apparatus, or refrigerator using a short-range communication scheme such as Bluetooth or near field communication (NFC). The electronic device 101 may add found home appliances to a registered external device group. The registered external device group may be defined as a group in which home appliances capable of being set as a target device among surrounding home appliances sensed by the electronic device 101 are registered. A home appliance included in the registered external device group may provide predetermined information to the electronic device 101 so that the electronic device 101 may quickly specify the home appliance as the target device. The electronic device 101 may add the home appliance included in the registered external device group to the user account of the electronic device 101. When the electronic device 101 specifies the target device among the home appliances included in the registered external device group, the electronic device 101 may provide the user account of the electronic device 101 to the target device so as to use the same user account as the user account registered in the electronic device 101 when setting a user account to use the target device.

When the electronic device 101 and the target device are registered with the same user account in the intelligence server 206, the electronic device 101 may receive information about the EM signal of the target device from the EM server 205. The electronic device 101 may store the information about the EM signal of the target device in the internal memory 130. Thereafter, when an EM signal sensed by the EM sensing circuit 200 is the same as a pre-stored EM signal, the electronic device 101 may specify the target device using the information about the stored EM signal. Immediately when the EM signal of the target device is sensed by the EM sensing circuit 200, the electronic device 101 may control the target device to operate so as to cope with contents of a voice input. Therefore, the target device may operate according to contents of a voice input without requiring a process in which the electronic device 101 transfers an EM signal to the EM server 205 and the EM server 205 analyzes the EM signal, and thus the target device may operate more quickly and accurately in response to a user's voice input.

Figure 3A:
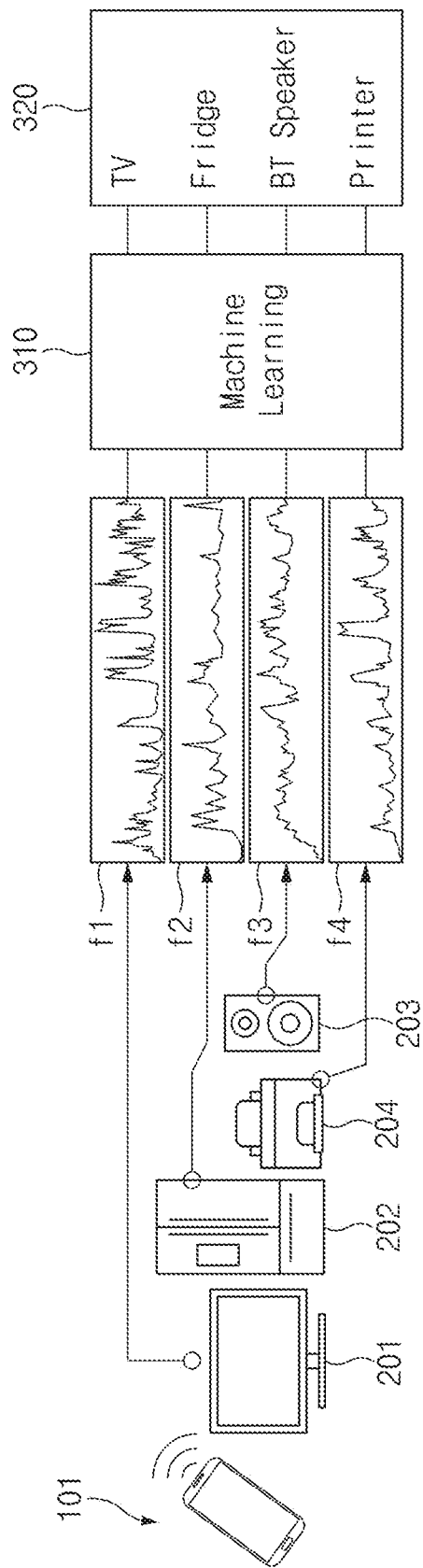
FIG. 3A is a conceptual diagram illustrating that external electronic devices are identified using an EM signal according to an embodiment.
Figure 3B:
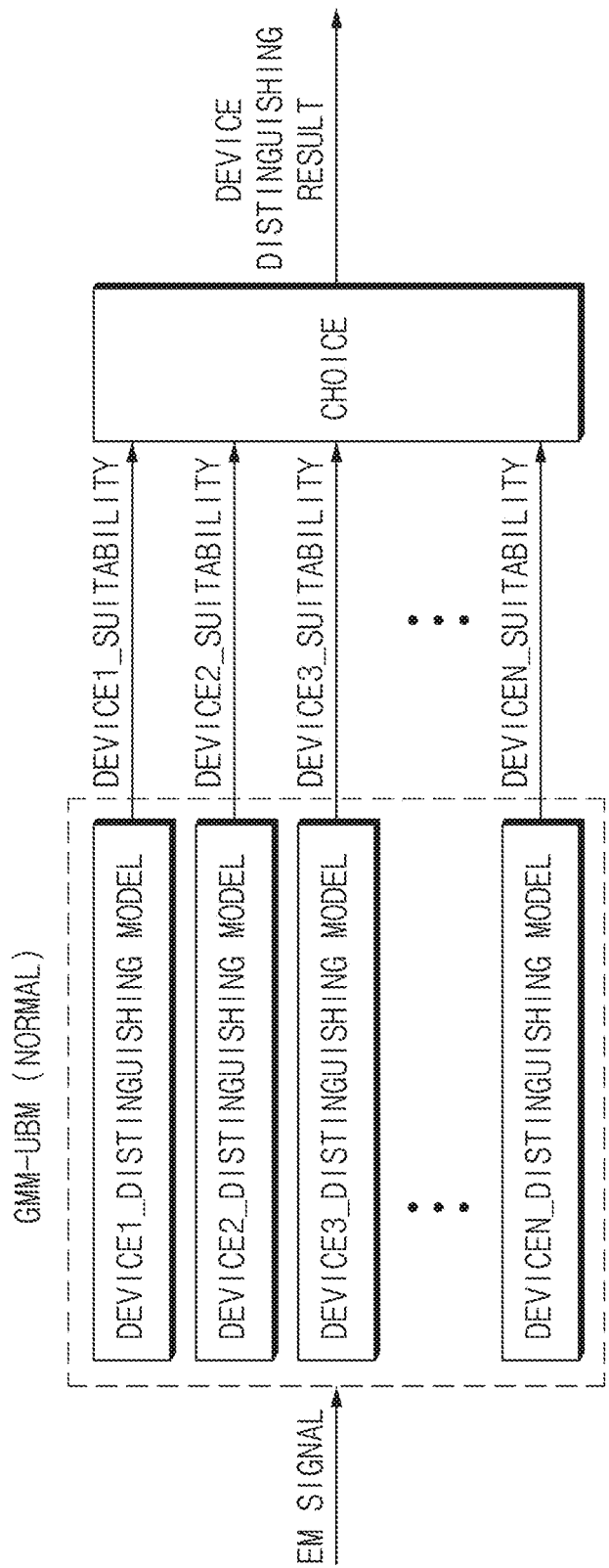
FIG. 3B is an exemplary block diagram illustrating machine learning according to an embodiment.

FIG. 3A is a conceptual diagram illustrating that external electronic devices 201, 202, 203, and 204 are identified using an EM signal according to an embodiment. FIG. 3B is an exemplary block diagram illustrating machine learning 310 according to an embodiment.

Referring to FIG. 3A, a plurality of external electronic devices 201, 202, 203, and 204 may be arranged around the electronic device 101. For example, a TV 201, a refrigerator 202, a Bluetooth speaker 203, and a printer 204 may be arranged around the electronic device 101. According to an embodiment, the plurality of external electronic devices 201, 202, 203, and 204 may include various electronic components therein. The plurality of external electronic devices 201, 202, 203, and 204 may emit electromagnetic (EM) signals by virtue of electromagnetic interference (EMI) generated from the internal electronic components. The EM signals may include a plurality of unique signals f1, f2, f3, and f4 within a set frequency range. The electronic device 101 may obtain EM signals of a specific frequency band among EM signals. For example, EM signals having a specific frequency within a frequency band of 1 MHz or less may be obtained through the EM sensing circuit 200.

Figure 4:
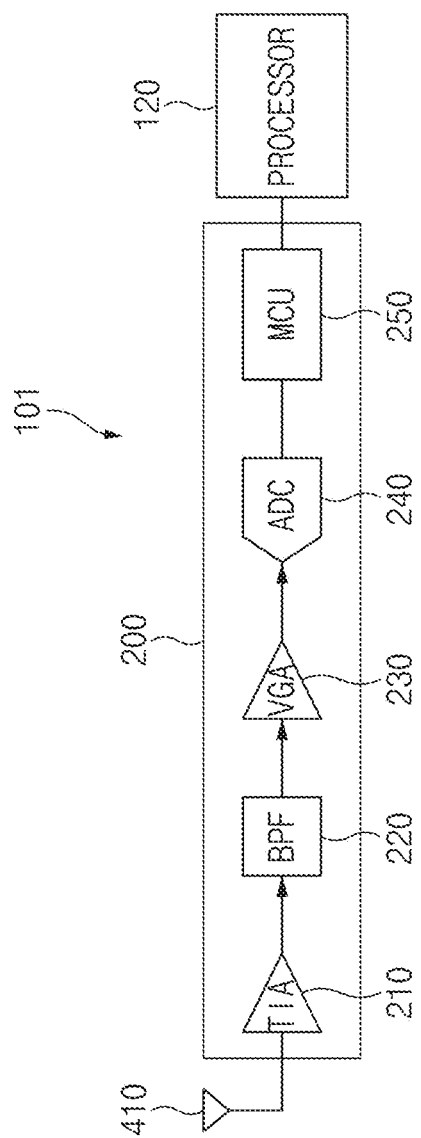
FIG. 4 is a block diagram illustrating components for performing EM sensing of an electronic device according to an embodiment.

According to an embodiment, when the electronic device 101 approaches one of the plurality of external electronic devices 201, 202, 203, and 204, the electronic device 100 may detect a unique signal caused by the above-mentioned electromagnetic interference through a sensing module (e.g., the EM sensing circuit 200 of FIG. 2) and a receiving module (e.g., the antenna 410 of FIG. 4). For example, the electronic device 101 may confirm and specify (320) the target device by performing machine learning (ML) 310 on the EM signal received by the EM sensing circuit 200. For another example, the electronic device 101 may transmit the first information based on the EM signal to the EM server 205. The EM server 205 may confirm and specify (320) the target device through a process of the machine learning 310.

In more detail, after a function of the electronic device 101 associated with EM sensing is activated, when the user brings the electronic device 101 close to any one external electronic device among the plurality of electronic devices 201, 202, 203, and 204, the electronic device 101 may obtain the EM signal generated from the external electronic device. The obtained EM signal may be analyzed by a classifier stored in the electronic device 101, or may be transmitted to a server (e.g., the EM server 205) which performs an EM signal analysis operation.

According to an embodiment, the classifier may perform a function of distinguishing a model name of an external electronic device. The function of distinguishing the model name of an external electronic device may be trained using training data in a separate server (e.g., the intelligence server 206) and may be stored in the electronic device 101. Furthermore, the classifier may be continuously trained and updated in order to improve recognition accuracy or add a target device. The learning algorithm may be a machine learning algorithm including at least one of deep learning, Gaussian mixture model (GMM), support vector machine (SVM), or random forest.

For example, in the case of applying a GMM scheme, operation may be performed as illustrated in FIG. 3B. The electronic device 101 or the EM server 205 that has received the EM signal has distinguishing models for each of a plurality of external electronic devices to which the machine learning 310 is applicable. When the EM signal is applied to each distinguishing model, a suitability corresponding to each external electronic device may be calculated. The electronic device 101 or the EM server 205 may distinguish the model name of an external electronic device using the suitability. The electronic device 101 or the EM server 205 may have a frequency table in which various distinguishing models are applied while applying various machine learning algorithms.

According to an embodiment, the electronic device 101 may receive, from the EM server 205, the second information including information specifying (320) a target device. The electronic device 101 may specify (320) and output the first external device based on the second information calculated through the process of the machine learning 310. According to an embodiment, information about a target device may be displayed through a display (e.g., the display 160 of FIG. 2) of the electronic device 101. However, an embodiment is not limited thereto, and the information about a target device may be output acoustically.

According to an embodiment, the electronic device 101 may include a memory (e.g., the memory 130 of FIG. 1), which stores a waveform table including a plurality of unique signals corresponding to the plurality of external electronic devices 201, 202, 203, and 204. However, an embodiment is not limited thereto, and the waveform table may be stored in the EM server 205 capable of communicating with the electronic device 101 via a network. The electronic device 101 may perform an operation of comparing the plurality of unique signals stored in the waveform table with an EM signal sensed through communication with the EM server 205. After transmitting the first information including a detected EM signal to the EM server 205, the electronic device 101 may receive, from the EM server 205, identification information about a target device having a waveform matching the EM signal included in the first information.

According to an embodiment, the electronic device 101 may execute a specific application based on the identification information about the target device. For example, when the target device is identified as a TV, the electronic device 101 may automatically execute an application related to a remote controller, and, simultaneously, may automatically perform a connection to the TV. The electronic device 101 may be made stand by in a state of being capable of controlling the target device only by bringing the electronic device 101 close to the target device, thus improving convenience of the user.

FIG. 4 is a block diagram illustrating components for performing EM sensing of the electronic device 100 according to an embodiment.

The electronic device 101 may include an antenna 410 for detecting an EM signal emitted from a plurality of external electronic devices (e.g., the external electronic devices 201 and 202 of FIG. 2) and the EM sensing circuit 200 for analyzing the detected EM signal. According to an embodiment, the processor 120 of the electronic device 101 may identify a target device using detection information provided from the EM sensing circuit 200.

According to an embodiment, the EM sensing circuit 200 may include a trans-impedance amplifier (TIA) 210, a band pass filter (BPF) 220, a variable gain amplifier (VGA) 230, an analog-digital converter (ADC) 240, and a microcontroller unit (MCU) 250.

The antenna 410 may have a receiving bandwidth for receiving an EM signal. The trans-impedance amplifier 210 may amplify a frequency of 1 MHz or less received from the antenna 410. The band pass filter 220 may pass a frequency component specifying a characteristic pattern in an amplified signal received from the trans-impedance amplifier 210, and may filter noise that is a frequency component irrelevant to the characteristic pattern. According to an embodiment, the band pass filter 220 may pass a frequency component of 1 MHz or less in an EM signal, and may block a frequency component of higher than 1 MHz. According to an embodiment, the variable gain amplifier 230 may output a signal in a fixed level over a preset gain range in order to improve a noise characteristic of a filtered signal and an external interference signal removal characteristic. According to an embodiment, the analog-digital converter 240 may convert an analog signal provided from the variable gain amplifier 230 into a digital signal, and then may provide the digital signal to the MCU 250.

According to an embodiment, the MCU 250 may identify an external electronic device by comparing the EM signal converted into the digital signal with the waveform table stored in the electronic device 101. For example, the MCU 250 may compare a maximum amplitude of the EM signal and a waveform of the EM signal with a plurality of waveforms stored in the waveform table. The MCU 250 may provide identified information to the processor 120 of the electronic device 101. However, an embodiment is not limited thereto, and the MCU 250 may directly provide received identified information to the processor 120 of the electronic device 101. In this case, an operation of identifying a target device through waveform comparison may be performed by the processor 120 of the electronic device 101.

According to an embodiment, the electronic device 101 may be required to minimize noise generated by itself in order to detect an optimum input signal waveform. According to an embodiment, since a signal generated by the electronic device 101 may be applied to the EM sensing circuit 200, it may be necessary to perform a compensation for this signal application. According to an embodiment, in order to minimize an input error, the electronic device 101 may apply a compensation algorithm after recognizing internal noise due to a touch screen input, and may detect a distorted waveform according to a holding type when a plurality of antennas 410 are configured. According to various conditions of the electronic device 101, such as a touch input by the user and a state in which the electronic device 101 is held, an EM signal sensed by the electronic device 101 may differ from an EM signal generated by a target device. According to an embodiment, the electronic device 101 may compare a measured EM signal with unique electromagnetic interference detection information about the target device to continuously collect information. According to an embodiment, collected information may be used for electromagnetic interference detection correction after discovering a correlation with the electromagnetic interference detection information through big data analysis. The big data analysis may include techniques of regression analysis and clustering or association analysis.

According to an embodiment, the processor 120 may receive the EM signal received through the antenna 410. The processor 120 according to an embodiment may receive the EM signal generated by one target device. The processor 120 may confirm the type and model name of the target device from the EM signal analyzed through the EM sensing circuit 200. The processor 120 may transmit the EM signal generated by the target device to the EM server 205 to analyze the EM signal.

According to another embodiment, the processor 120 may control so that only an EM signal having a highest reception strength among EM signals generated by the external electronic device 201, 202, 203, and 204 is provided to the processor 120. According to another embodiment, the processor 120 may control so that only EM signals which satisfy a set criterion among the EM signals generated by the external electronic device 201, 202, 203, and 204 are provided to the processor 120 in order for the EM sensing circuit 200 to selectively detect an EM signal.

According to an embodiment, the processor 120 may control so that only EM signals generated from the external electronic devices 201, 202, 203, and 204 located within a fixed distance from the electronic device 101 among EM signals sensed by the EM sensing circuit 200 are provided to the processor 120. When sensing only EM signals generated within a fixed distance, only the external electronic devices 201, 202, 203, and 204 located physically within a fixed range from the electronic device 101 may be sensed. The electronic device 101 may perform an operation of confirming whether the external electronic devices 201, 202, 203, and 204 are present near the electronic device 101 using short-range communication such as BLE, WiFi, or NAN.

According to another embodiment, the processor 120 may control, based on information sensed by the EM sensing circuit 200, so that only an EM signal generated from a target device which is to perform an operation among EM signals generated from the external electronic devices 201, 202, 203, and 204 are provided to the processor 120. For example, the processor 120 may be configured so that the EM sensing circuit 200 senses an EM signal having a highest signal strength among EM signals. For another example, the processor 120 may be configured so that the EM sensing circuit 200 senses an EM signal generated from a device closest to the electronic device 101 based on location information about the external electronic devices 201, 202, 203, and 204. The electronic device 101 may perform an operation of confirming location information about the electronic devices 201, 202, 203, and 204 using short-range communication.

For example, when the electronic device 101 sets, as a target device, a TV which is a closest device among the external electronic devices 201, 202, 203, and 204 located in a living room to perform sensing, the electronic device 101 may sense only an EM signal generated from the TV by sensing a strongest EM signal generated from the TV. For another example, the electronic device 101 may confirm the location information about the TV located in a living room so as not to sense a TV located in another room. Accordingly, EM signals which are not required to be sensed and analyzed are prevented from being input, thereby improving efficiency of sensing and analysis. Furthermore, the accuracy of sensing a target device among the external electronic devices 201, 202, 203, and 204 by the electronic device 101 may be improved.

According to an embodiment, the electronic device 100 may control so that only EM signals generated from the external electronic devices 201, 202, 203, and 204 capable of executing contents of a user's voice input among the external electronic devices 201, 202, 203, and 204 detected through EM signals sensed by the EM sensing circuit 200 are provided to the processor 120. The EM sensing circuit 200 may sense EM signals generated from the external electronic devices 201, 202, 203, and 204. The processor 120 may understand contents of the sensed EM signals to select an EM signal generated from an external electronic device capable of executing contents of a user's voice input. The processor 120 may designate the external electronic devices 201, 202, 203, and 204 substantially related to contents of a user's voice input as a group of candidates that may become a target device. For example, in response to the voice input "transfer a picture", the processor 120 may select EM signals from a TV and notebook computer capable of receiving a picture among smart home appliances, or may designate a TV and notebook computer as a candidate group. When executing the command to "transfer a picture", the processor 120 may receive, from the EM sensing circuit 200, EM signals generated from a TV and a notebook computer, but may not receive, from the EM sensing circuit 200, an EM signal generated from a speaker. Accordingly, the electronic device 101 may prevent EM signals which are not required to be sensed and analyzed from being input to the processor 120, thereby improving the efficiency of sensing and analysis of the processor 120. Furthermore, the accuracy of sensing a target device among the external electronic devices 201, 202, 203, and 204 by the electronic device 101 may be improved.

Figure 5:
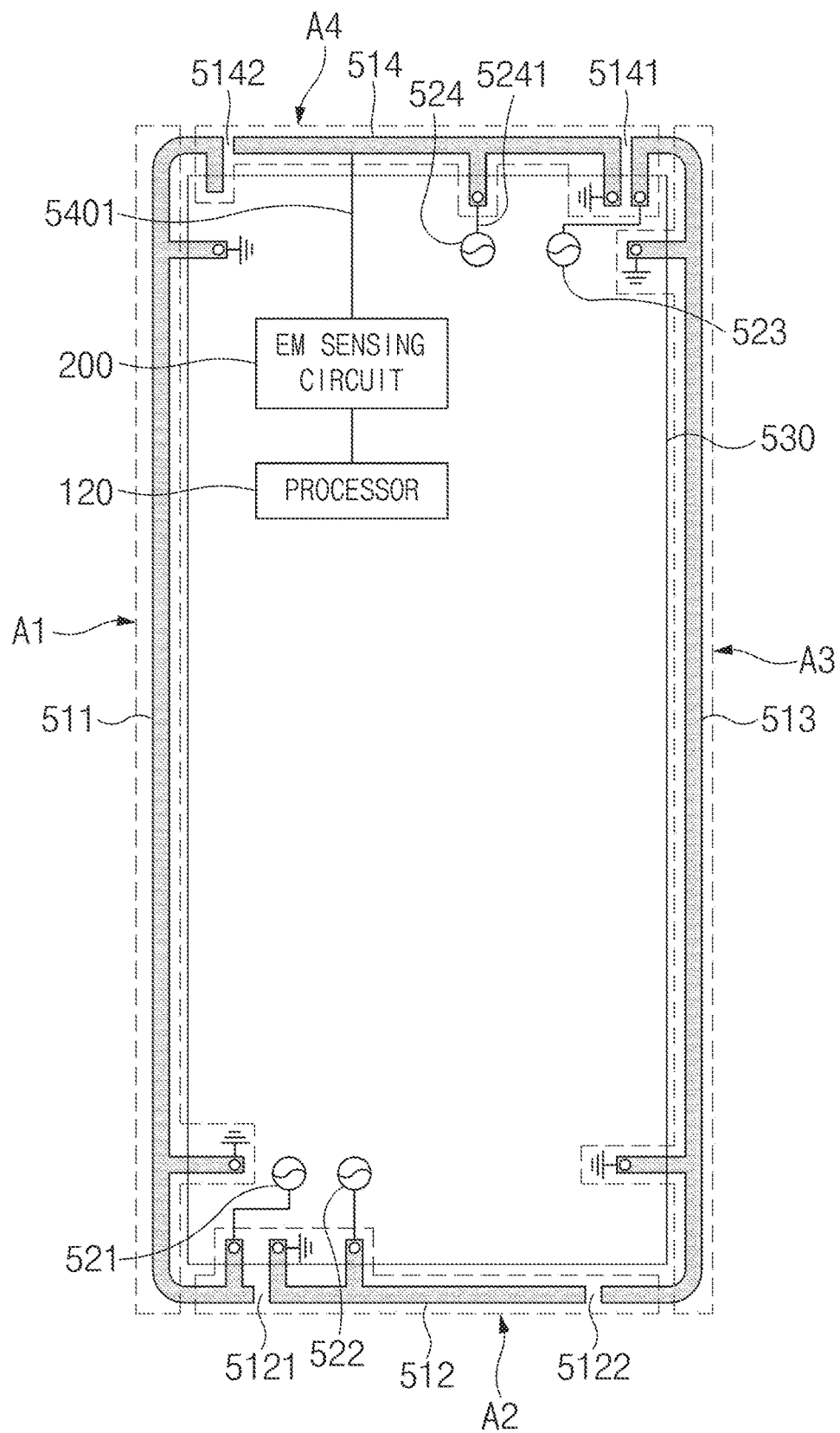
FIG. 5 is a planar diagram illustrating an antenna of an electronic device according to an embodiment.

FIG. 5 is a planar diagram illustrating an antenna of the electronic device 101 according to an embodiment. In the electronic device 101, an antenna for sensing an EM signal without distortion may be arranged so as to conform to an edge of the electronic device 101. In order to improve the efficiency of EM signal sensing, at least a portion of a housing defining a perimeter of the electronic device 101 may be used as an antenna.

Referring to FIG. 5, at least a portion of a housing used as an antenna of an electronic device (e.g., the electronic device 101 of FIG. 2A) may be formed with a conductive member. According to an embodiment, the housing may be formed using a method in which a conductive member and a non-conductive member are double-shot injection molded. According to an embodiment, at least a portion of the housing may be arranged so as to be exposed along an edge of the electronic device.

According to an embodiment, the housing formed with a metal member may include a first side surface 511 having a first length, a second side surface 512 extending in a direction vertical to the first side surface 511 and having a second direction, a third side surface 513 extending from the second side surface 512 in parallel with the first side surface 511 and having the first length, and a fourth side surface 514 extending from the third side surface 513 in parallel with the second side surface 512 and having the second length. According to an embodiment, the first side surface 511, the second side surface 512, the third side surface 513, and the fourth side surface 514 may be integrally formed. According to an embodiment, the first length may be longer than the second length.

According to an embodiment, the second side surface 512 may have formed therein a unit conductive portion electrically separated by a pair of non-conductive portions 5121 and 5122 spaced a fixed distance apart. Furthermore, the fourth side surface 514 may also have formed therein a unit conductive portion electrically separated by a pair of non-conductive portions 5141 and 5142 spaced a fixed distance apart. According to an embodiment, at least one of a plurality of conductive portions electrically separated by the non-conductive portions 5121, 5122, 5141, and 5142 may be electrically connected to feeding portions 521, 522, 523, and 524 electrically connected to a wireless communication circuit (not shown) arranged on a PCB 530, so as to be used as at least one antenna operating in a resonance frequency band. Antennas may be formed on the first side surface 511 to the fourth side surface 514. For example, the second side surface 512 may be configured as a second antenna portion A2 operating in a low band, and the fourth side surface 514 may be configured as a fourth antenna portion A4 operating in a mid band and a high band. However, an embodiment is not limited thereto, the first side surface 511 may be configured as a first antenna portion A1, and the third side surface 513 may be configured as a third antenna portion A3.

According to various embodiments, the EM sensing circuit 200 may be electrically connected to a conductive member used as any one antenna portion among the first, second, third, and fourth antenna portions A1, A2, A3, and A4. According to an embodiment, the EM sensing circuit 200 may be electrically connected to the fourth side surface 514 that is most favorable for contacting or approaching an external electronic device without being affected by a holding state of the user. According to an embodiment, the EM sensing circuit 200 may be connected to the communication circuit 524 by a conductive line 5241 so as to be electrically connected to the fourth side surface 514. According to an embodiment, the fourth side surface 514 may be interchangeably used as an antenna radiator for communication and an antenna radiator for electromagnetic interference detection. In this case, the EM sensing circuit 200 may detect an EM signal of an external electronic device using the fourth side surface 514, and may provide information about a detected signal to the processor 120 of the electronic device 101.

Figure 6:
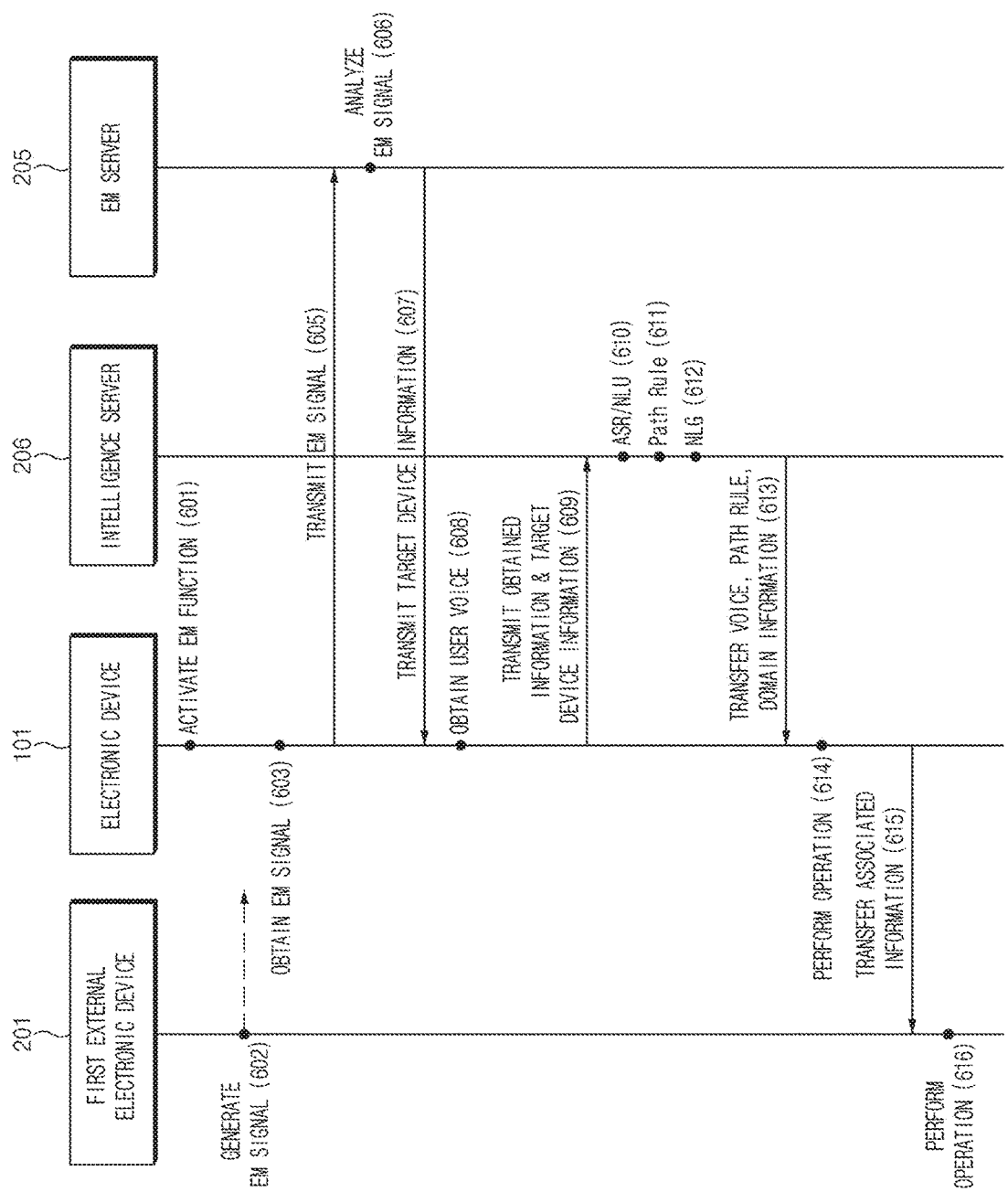
FIG. 6 is a sequence diagram illustrating a control method of an electronic device according to an embodiment.

FIG. 6 is a sequence diagram illustrating a control method of the electronic device 101 according to an embodiment. In FIG. 6, it is assumed that an EM signal is received from the first external electronic device 201.

In operation 601, the electronic device 101 may activate an EM function by turning on the EM sensing circuit 200. When an EM sensing function is activated, the electronic device 101 may detect an EM signal generated from an external electronic device (e.g., the first external electronic device 201 of FIG. 2A).

In operation 602, the first external electronic device 201 may generate an EM signal. When power is applied, the first external electronic device 201 may generate an EM signal having a unique waveform and frequency characteristic based on an electronic component mounted in the first external electronic device 201 and an operation state thereof. Furthermore, EM signals may be generated, which have different strengths and forms in a state in which the first external electronic device 201 actively operates and in a stan-by state.

In operation 603, the EM sensing circuit 200 of the electronic device 101 may obtain the EM signal emitted from the first external electronic device 201. The EM sensing circuit 200 may provide the obtained EM signal to the processor 120. The processor 120 may generate first information including the EM signal.

In operation 605, the processor 120 of the electronic device 101 may transmit the first information to the EM server 205 via the communication circuit 190. The first information transmitted to the EM server 205 may include the EM signal, data including EM signal information, or information generated based on the EM signal. Accordingly, the processor 120 may transmit the EM signal, the data including EM signal information, or the information generated based on the EM signal to the EM server 205.

In operation 606, the EM server 205 may analyze the EM signal received from the electronic device 101. The EM server 205 may analyze the first information including the EM signal to generate second information specifying the first external electronic device 201 as a target device.

In operation 607, the EM server 205 may transmit target device information to the electronic device 101. The electronic device 101 may transmit, to the processor 120, the second information received from the EM server 205 via the communication circuit 190. Since the second information transmitted from the EM server 205 to the electronic device 101 includes the target device information specifying a target device, the EM server 205 may transmit the target device information to the electronic device 101.

In operation 608, the electronic device 101 may obtain a user's voice through the microphone 111. According to an embodiment, the user's voice input obtained by the electronic device 101 may include only information about an operation to be performed by a target device without specifying a target device. For example, the electronic device 101 may obtain a voice input which lacks an object, such as "picture transfer", "turn on", and "volume up". A time at which the electronic device 101 performs operation 608 is not limited, and may variously change according to a situation. For example, the electronic device 101 may obtain a user's voice after the EM signal is obtained. In another example, the electronic device 101 may obtain a user's voice simultaneously when obtaining an EM signal. In another example, the electronic device 101 may obtain an EM signal within a set time after receiving an input of a user's voice.

In operation 609, the processor 120 may transmit voice data based on the obtained voice input and the second information including the target device information to the intelligence server 206 via the communication circuit 190.

In operation 610, the intelligence server 206 may analyze obtained voice data. The intelligence server 206 may convert the voice data into a format recognizable by a target device (e.g., the first external electronic device 201) through automatic speech recognition (ASR) and natural language understanding (NLU). The voice data may be converted into information that is in a state enabling generation of mechanical data for operating the first electronic device 201 while undergoing the automatic speech recognition and natural language understanding.

In operation 611, the intelligence server 206 may generate a path rule that is states of a plurality of sequences. The intelligence server 206 may configure a rule that determines an order of operations to be performed by the first external electronic device 201 and a driving state within the order.

In operation 612, the intelligence server 206 may generate a natural language through a natural language generation (NLG) module. The natural language generation module may change designated information into a text form. The information changed into a text form may have a form of a natural language utterance. The designated information may be, for example, information about an additional input, information notifying completion of an operation corresponding to a user input, or information for guiding the user to provide an additional input (e.g., feedback information for a user input).

In operation 613, the intelligence server 206 may transfer, to the electronic device 101, at least a portion of voice information including information about a target device (e.g., the first external electronic device 201) specified based on the voice input and the second information, a path rule, and domain information. The electronic device 101 may transfer, to the processor 120, at least a portion of the voice information, path rule, and domain information received from the intelligence server 206 via the communication circuit 190. The electronic device 101 may establish a communication connection between the electronic device 101 and the first external electronic device 201 via the communication circuit 190 at least partially based on a sequence of states.

In operation 614, when the processor 120 of the electronic device 101 obtains at least a portion of the voice information, the path rule, and the domain information, the electronic device 101 may perform an operation corresponding to the voice information, the path rule, and the domain information.

In operation 615, the electronic device 101 may transfer, to the first external electronic device 201, information required for the first external electronic device 201 to perform an operation or information associated with operation of the first external electronic device 201. According to an embodiment, the electronic device 101 may transfer a portion of the sequence of states to the first external electronic device 201.

According to an embodiment, the voice analysis server 206 may directly transfer, to the first external electronic device 201, at least a portion of the voice information, the path rule, and the domain information.

In operation 616, the first external electronic device 201 may perform an operation instructed by the user by voice, based on at least a portion of the voice information, path rule, and domain information received from the electronic device 101. For example, the first external electronic device 201 may perform an operation based on a sequence of states associated with a user voice.

Figure 7A:
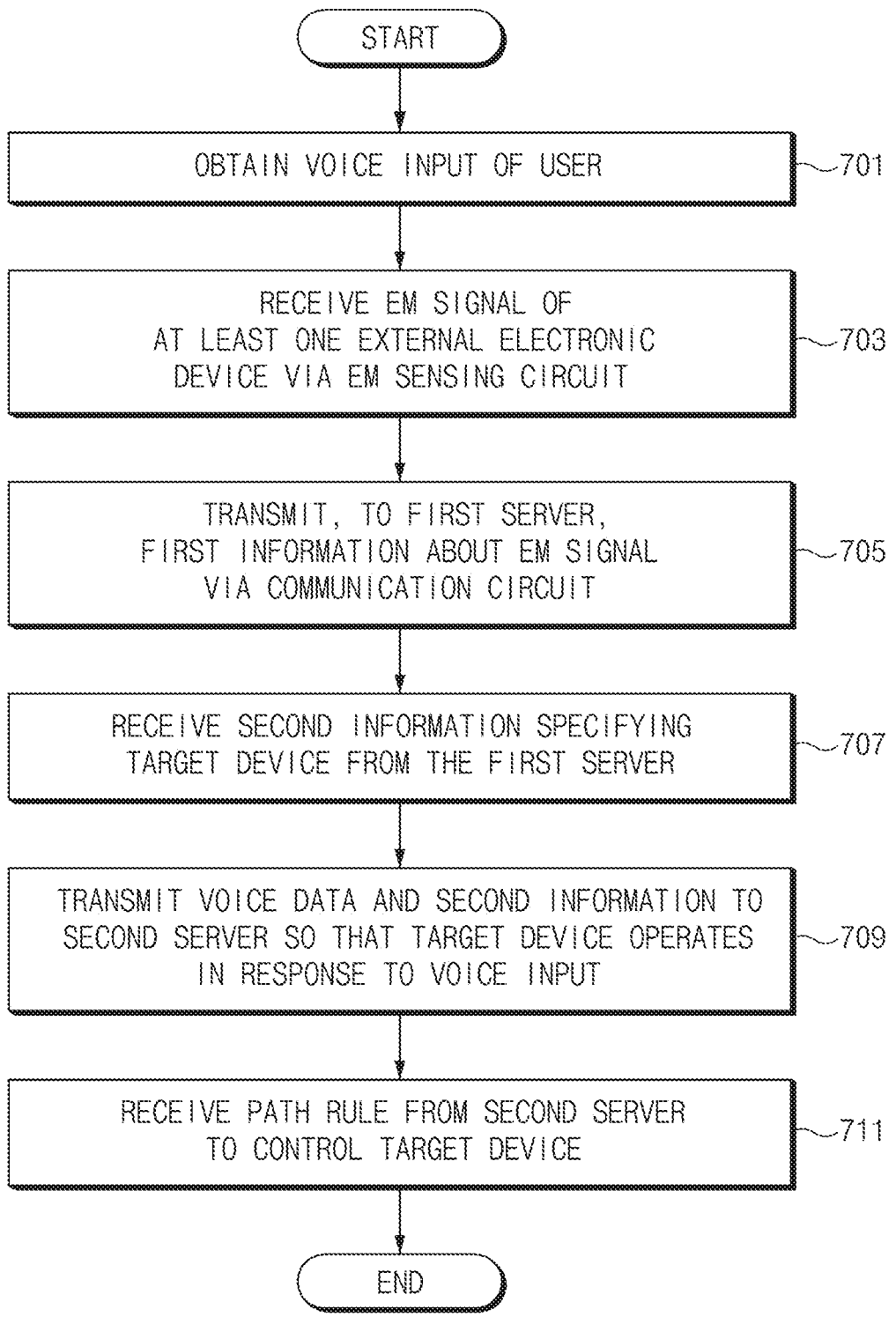
FIGS. 7A and 7B are flowcharts illustrating control methods of an electronic device according to an embodiment.
Figure 7B:
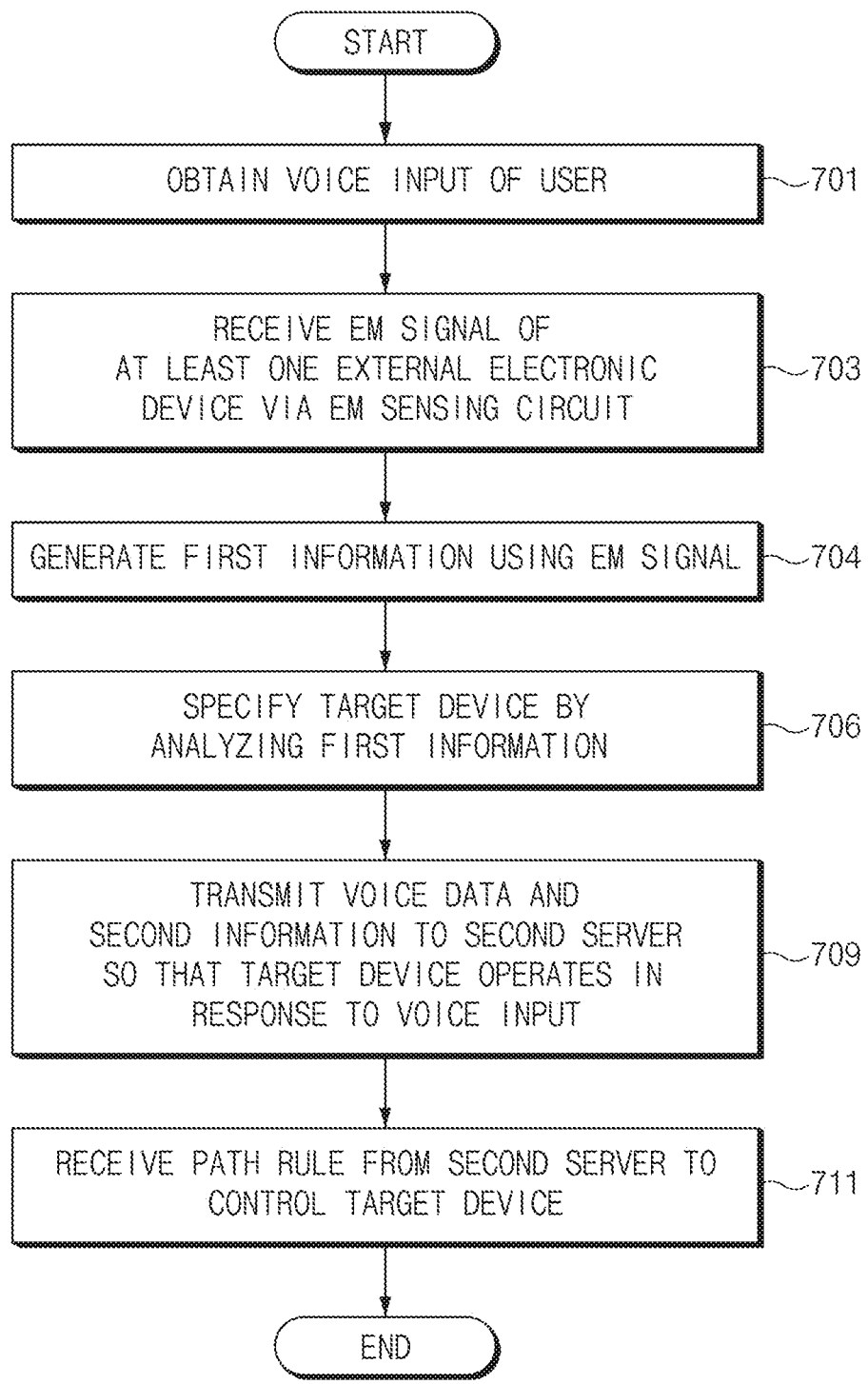

FIGS. 7A and 7B are flowcharts illustrating control methods of the electronic device 101 according to an embodiment.

FIG. 7A illustrates the case where the electronic device 101 according to an embodiment transmits first information about an EM signal to the EM server 205, and the EM server 205 analyzes the first information to specify a target device.

In operation 701, the electronic device 101 may obtain a user's voice input through the microphone 111. The user's voice input obtained through the microphone 111 may be provided to the processor 120. The user's voice input may only include instruction contents without specifying a target device which is to perform an operation. The contents of the voice input may be input to the processor 120 of the electronic device 101. The voice input may be converted into a natural language by the processor 120.

In operation 703, the electronic device 101 may receive an EM signal of at least one external electronic device via the EM sensing circuit 200. As described above, the user's voice input may only include instruction contents of an uttered sentence without including a target for instruction. For example, when the user's voice input, such as "transfer a picture", does not include a target for instruction and thus a target device cannot be specified, the electronic device 101 may prepare to sense an EM signal emitted from at least one external electronic device by activating the EM sensing circuit 200. The electronic device 101 may determine whether a target for instruction is included in the uttered sentence simultaneously upon receiving the user's voice input. For another example, the electronic device 101 may be configured to receive an EM signal of at least one external electronic device simultaneously when the user's voice is input. The electronic device 101 may activate the EM sensing circuit 200 when a voice begins to be input regardless of contents of a voice input.

The processor of the electronic device 101 according to an embodiment may control the EM sensing circuit 200 to activate a function for EM sensing when a Bixby button that is an intelligence voice recognition user interface (UI) is pressed. The electronic device 101 may obtain an EM signal generated by an external electronic device by activating the EM sensing circuit 200. The electronic device 101 may transfer first information about the EM signal to the EM server 205.

The EM sensing circuit 200 may be activated when a target device cannot be specified since the user's voice input does not include a target for instruction. The electronic device 101 may recognize that the user's voice input does not include a target for instruction, and may request the user to specify the target device. The electronic device 101 may receive the EM signal from the EM sensing circuit 200, and may transmit the received EM signal to the EM server 205 to specify the target device. The electronic device 101 may request to specify a target through a voice guide or a visual guide on the display 160. The electronic device 101 may sense the EM signal of the target device instead of receiving an additional voice of the user when the user attempt to specify the target device. The EM sensing circuit 200 may be activated when the electronic device 101 requests to specify the target, so as to sense the EM signal of the target device tagged by the user or brought closer by the user. The electronic device 101 may selectively activate the EM sensing circuit 200 only when the target device cannot be specified, so as to prevent unnecessary activation of the EM sensing circuit 200, thus reducing power consumption.

In operation 705, the electronic device 101 may transmit the first information about the EM signal to the EM server 205 via the communication circuit 190. According to an embodiment, the first information generated by the EM sensing circuit 200 may be analyzed through the EM server 205 having information related to the external electronic devices 201 and 202. The electronic device 100 may send the first information to the EM server 205. The EM server 205 may receive the first information. The EM server 205 may analyze the first information based on the information related to the external electronic devices 201 and 202.

In an embodiment, the first information may include at least a portion of the waveform of an EM signal, an average amplitude of the waveform of the EM signal, and numerical information about a main frequency that is a primary frequency component constituting the EM signal. The processor 120 may control the communication circuit 190 to transmit the first information about an EM signal to the EM server 205 including information about a plurality of EM signals.

In operation 707, the electronic device 101 may receive, from the EM server 205 via the communication circuit 190, second information transmitted in response to the first information and specifying the target device which is to perform an operation based on the user's voice input among at least one external electronic device 201 and 202.

The EM server 205 may generate the second information in response to reception of the first information from the electronic device 101. The EM server 205 may compare the waveform of an EM signal, the average amplitude of the waveform of the EM signal, or the numerical value about a main frequency that is a primary frequency component constituting the EM signal, which are included in the first information, with a plurality of pre-stored EM signals. Each of the plurality of pre-stored EM signals may include the type, operation state, or model name of a corresponding electronic device. The EM server 205 may analyze the EM signal included in the first information to confirm which EM signal among the plurality of pre-stored EM signals the EM signal corresponds to.

For example, an EM signal having a waveform in which a triangular wave and a sinusoidal wave are 1:1 mixed, an average amplitude of 0.1 nm, and a main frequency component of 1 MHz may be emitted from a notebook computer which maintains an idle state after being turned on. Here, when the first information about an EM signal corresponding to the above EM signal is input, the EM server 205 may confirm that the first information is information about the EM signal generated from the notebook computer.

The EM server 205 may analyze the information about the EM signal to confirm which EM signal among the plurality of pre-stored EM signals the EM signal corresponds to, so as to specify the target device that has emitted the EM signal. The EM server 205 may generate the second information specifying the target device. The processor 120 may receive the second information from the EM server 205 via the communication circuit 190.

In operation 709, the electronic device 101 may transmit voice data based on the voice input and the second information to the intelligence server 206 via the communication circuit 190 so that the target device operates based on the voice input.

For example, the electronic device 101 may transmit, to the intelligence server 206, the second information specifying the target device and the voice data including contents that give instructions on how to operate the target device in order to operate the target device. The intelligence server 206 may generate information capable of operating the target device by combining the voice data with the second information. The intelligence server 206 may use the generated information to generate a path rule for configuring an operation sequence of the target device.

In operation 711, the electronic device 101 may receive the path rule from the intelligence server 206. The electronic device 101 may control the target device so that the target device operates based on the received path rule. The electronic device 101 may transmit, to the target device, information required for the target device to perform an operation specified in the path rule.

FIG. 7B illustrates the case where the electronic device 101 according to an embodiment generates first information about an EM signal, and the electronic device 101 analyzes the first information to specify a target device. Since operation 701, operation 703, operation 709, and operation 711 of FIG. 7B are substantially the same as operation 701, operation 703, operation 709, and operation 711 of FIG. 7A, descriptions of these operations are not provided.

In operation 704, the processor 120 of the electronic device 101 according to an embodiment may generate first information using an EM signal received from the EM sensing circuit 200. The electronic device 101 may store information related to the external electronic devices 201 and 202 in the EM sensing circuit 200 or the memory 130.

In operation 706, the electronic device 101 may analyze the first information based on the information related to the external electronic devices 201 and 202. The electronic device 101 may analyze the first information to specify a target device which is to perform an operation based on a user's voice input. The electronic device 101 may detect the target device that has emitted an EM signal, using the information related to the external electronic devices 201 and 202.

Figure 8A:
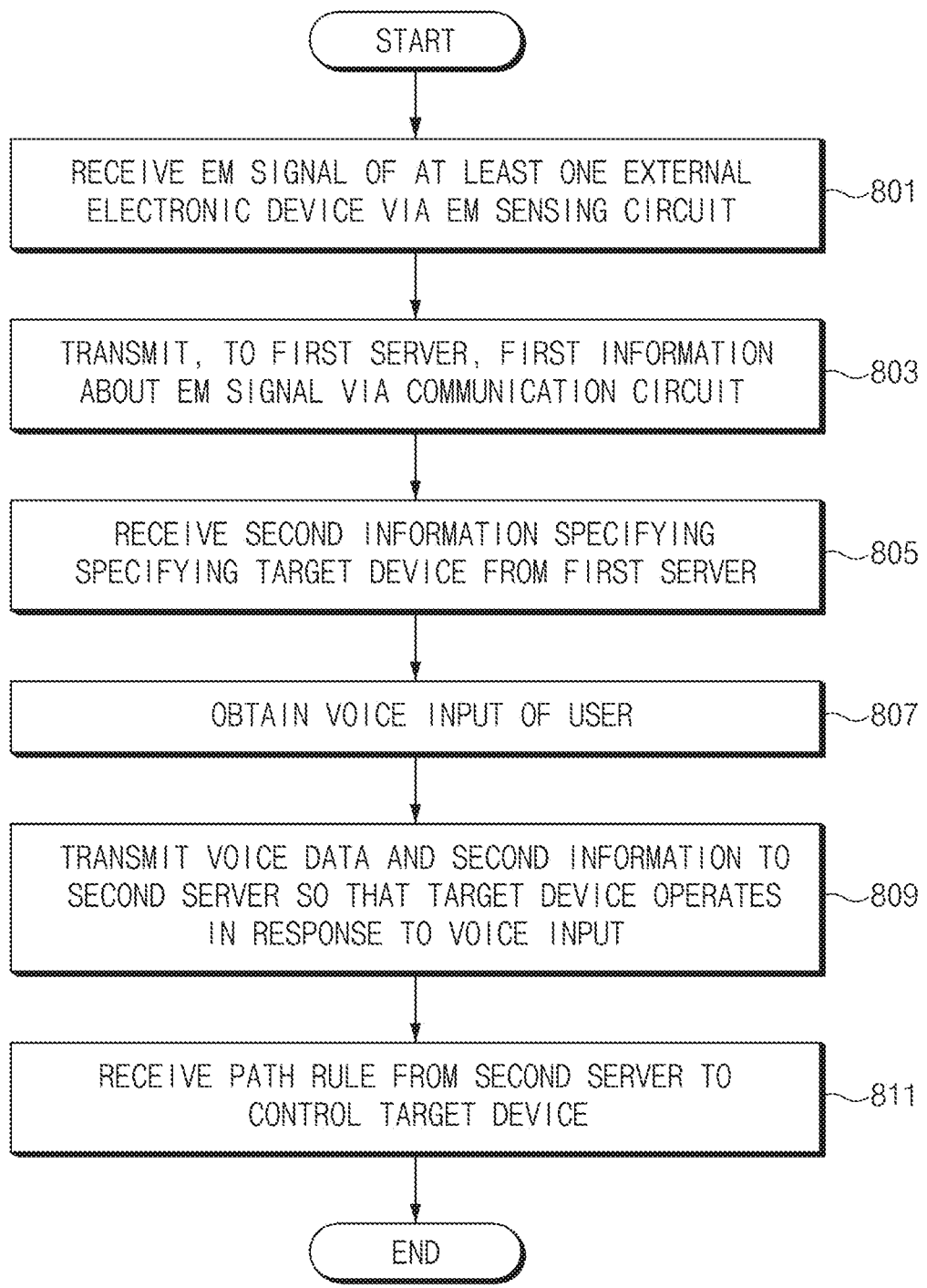
FIGS. 8A and 8B illustrate the cases where an electronic device according to an embodiment obtains a user's voice input after receiving an EM signal.
Figure 8B:
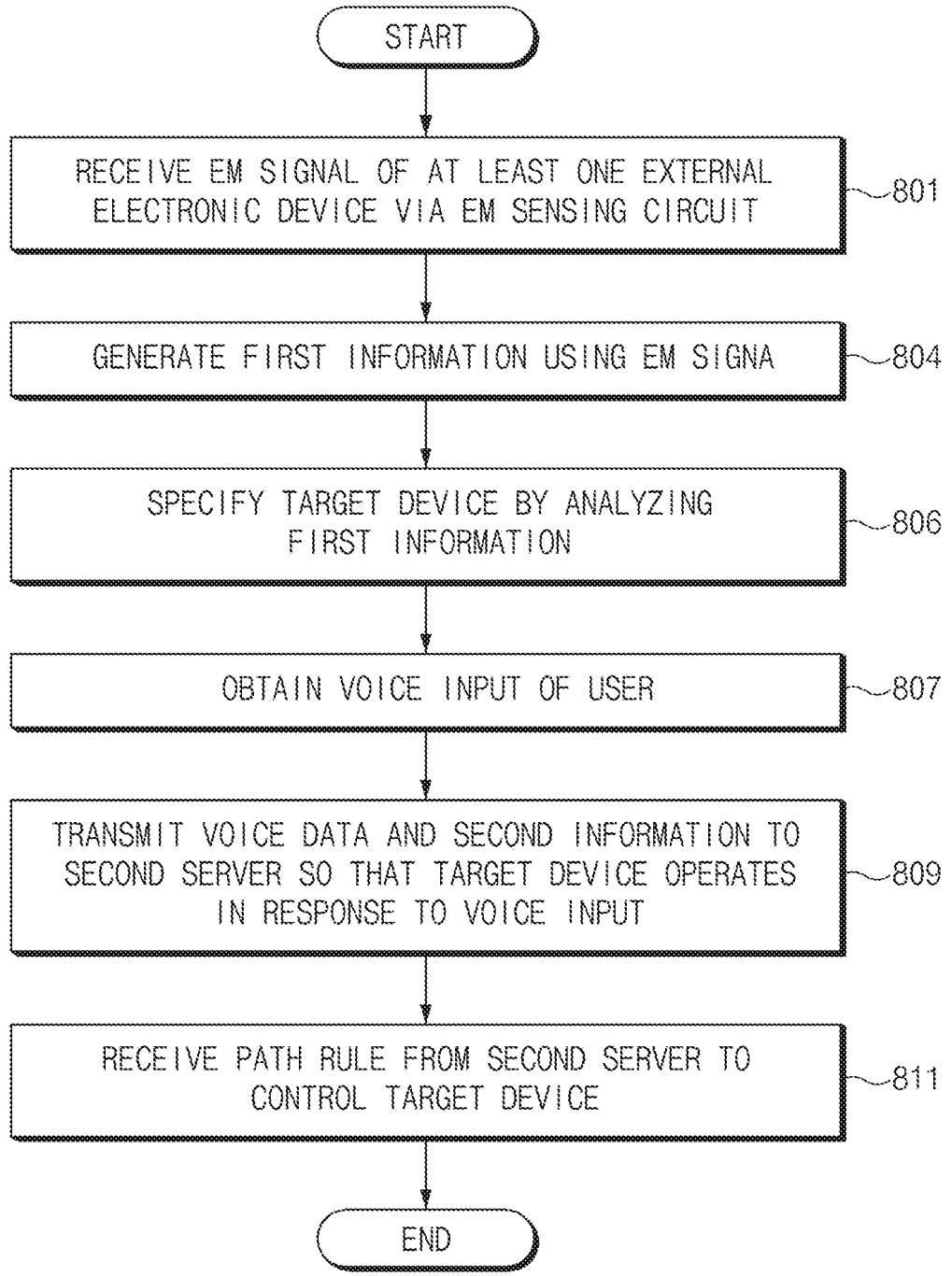

FIGS. 8A and 8B illustrate the cases where the electronic device 101 according to an embodiment obtains a user's voice input after receiving an EM signal.

In operation 801, the electronic device 101 may receive an EM signal of at least one external electronic device via the EM sensing circuit 200. The electronic device 101 may prepare to sense an EM signal emitted from the external electronic device by activating the EM sensing circuit 200. The EM sensing circuit 200 according to an embodiment may continuously maintain an activated state while the electronic device 101 is turned on.

The EM sensing circuit 200 according to an embodiment may be activated when the display 160 is turned on. The electronic device 101 may maintain an activated state while the display 160 is turned on. In this case, the EM sensing circuit 200 may specify, in advance, a first external device that is a target which is to execute voice input, before obtaining a user's voice input. When the target device which is to perform an operation based on the voice input is specified by sensing an EM signal before obtaining the user's voice input, the first external device may be immediately controlled so as to operate according to contents of the voice input even if the user's voice input does not include a target for instruction. Therefore, a time required for specifying the first external device as the target device may be reduced.

In operation 803, the electronic device 101 may transmit the first information about the EM signal to the EM server 205 via the communication circuit 190. According to an embodiment, the first information generated by the EM sensing circuit 200 may be analyzed through the EM server 205 having information related to the external electronic devices 201 and 202. The electronic device 100 may send the first information to the EM server 205. The EM server 205 may receive the first information. The EM server 205 may analyze the first information based on the information related to the external electronic devices 201 and 202.

In an embodiment, the first information may include at least a portion of the waveform of an EM signal, an average amplitude of the waveform of the EM signal, and numerical information about a main frequency that is a primary frequency component constituting the EM signal. The processor 120 may control the communication circuit 190 to transmit the first information about an EM signal to the EM server 205 including information about a plurality of EM signals.

In operation 805, the electronic device 101 may receive, from the EM server 205 via the communication circuit 190, second information transmitted in response to the first information and specifying the first external electronic device 201 among at least one external electronic device 201 and 202 as the target device which is to perform an operation based on the user's voice input.

In operation 807, the electronic device 101 may obtain a user's voice input through the microphone 111. The microphone 111 may provide the obtained voice input of the user to the processor 120. The user's voice input may only include instruction contents without specifying a target device (e.g., the first external electronic device 201) which is to perform an operation. The contents of the voice input may be input to the processor 120 of the electronic device 101. The voice input may be converted into a natural language by the processor 120.

In an embodiment, the electronic device 101 may receive a user's utterance in a state in which an EM signal sensing function is activated. A voice input that is an obtained utterance of the user may only include instruction contents without a target for instruction. When the user's utterance does not specify a target device, the electronic device 101 may specify the target device using an EM signal.

In an embodiment, the EM sensing circuit 200 may be activated before the user utters, in order to maintain a state of being capable of specifying a target device before receiving the user's utterance. Therefore, operation 807 may be performed after operation 803 or operation 805. However, an embodiment is not limited thereto, and operation 807 may be performed simultaneously with operation 803 or operation 805.

In operation 809, the electronic device 101 may transmit voice data based on the voice input and the second information to the intelligence server 206 via the communication circuit 190 so that the target device operates based on the voice input. The electronic device 101 according to an embodiment may transmit, to the intelligence server 206, at least a portion of the voice data that is digital data corresponding to the obtained voice input and the second information about the target device.

The electronic device 101 may transmit the second information and the voice data received from the EM server 205 to the intelligence server 206. The intelligence server 206 may specify the target device as a target for instruction according to the second information. For example, the intelligence server 206 may supplement the voice data, which does not include a target for instruction, with a target for instruction by combining the second information that is information about the target device with the voice input as supplemental text data.

For example, the user may utter the wording "transfer the picture here" that does not specify a target device to the electronic device 101. A conventional electronic device 101 is required to confirm a target device by requesting the user to confirm which device is meant by the term "here". On the contrary, when the electronic device 101 according to an embodiment obtains the voice input "transfer the picture here", a target device specified by the electronic device 101 by sensing an EM signal may replace the term "here". The electronic device 101 may obtain information about the target device by sensing an EM signal, and may perform an operation of transferring a picture to the target device.

The electronic device 101 according to an embodiment may obtain a voice input after activating an EM sensing function. The electronic device 101 according to another embodiment may activate EM sensing after obtaining a voice input. The electronic device 101 according to another embodiment may obtain additional information about a target device by guiding for EM sensing in order to obtain the additional information after obtaining a voice input. For example, when the user utters the wording "transfer the picture here", the electronic device 101 may display an image or give a voice message which reads "scan the device corresponding to here". When a function associated with EM sensing is not activated, the electronic device 101 may perform an operation of activating the EM sensing circuit 200 simultaneously when guiding for EM sensing.

The electronic device 101 according to an embodiment may receive operation information generated using a voice from the intelligence server 206. For example, the electronic device 101 may transmit a portion of the received operation information to the target device. For another example, the electronic device 101 may control the target device based on the received operation information. For another example, the electronic device 101 may control the target device to directly receive the operation information from the intelligence server 206.

The electronic device 101 according to an embodiment may transfer, to the intelligence server 206, device information and information associated with a user's input, and may receive a sequence of states generated based on the transferred information, a voice associated with the sequence of states, and domain information associated with the sequence of states. The domain information may be information about the target device that is a target for instruction. For example, when the target device is identified as a TV and the user utters the wording "turn on", the domain information may indicate a TV.

According to an embodiment, the intelligence server 206 may generate, through natural language understanding analysis, a path rule for determining which sequence of states should be applied to a certain path planner. For example, when a voice input for constructing or controlling an environment of the Internet of things (IoT) is obtained, the intelligence server 206 determines that the Internet of things can be implemented with a specified application (e.g., Samsung connected or SmartThings), and may transfer the path rule associated with the specified application to the electronic device 101. When the electronic device 101 or the target device receives the path rule or voice, the target device may perform an operation corresponding to the received path rule.

According to an embodiment, the electronic device 101 may receive voice information related to the path rule transferred to the intelligence server 206. The voice information related to the path rule may be a voice for controlling an operation being currently performed when the path rule related to operation of a target device that is a target for request of the user is in progress and is associated with the operation being currently performed. For example, when an operation related to the path rule for controlling the Internet of things is in progress, the intelligence server 206 may transmit, to the electronic device 101, data information for expressing contents of control of the Internet of things, such as "searching for recent movies from TV" or "turning off the lamp in the kitchen", by voice or graphics.

In operation 811, the electronic device 101 may receive the path rule from the intelligence server 206. The electronic device 101 may control the target device so that the target device operates based on the received path rule. The electronic device 101 may transmit, to the target device, information required for the target device to perform an operation specified in the path rule.

FIG. 8B illustrates the case where the electronic device 101 according to an embodiment generates first information about an EM signal, and the electronic device 101 analyzes the first information to specify a target device. Since operation 801, operation 807, operation 809, and operation 811 of FIG. 8B are substantially the same as operation 801, operation 807, operation 809, and operation 811 of FIG. 8A, descriptions of these operations are not provided.

In operation 804, the processor 120 of the electronic device 101 according to an embodiment may generate first information using an EM signal received from the EM sensing circuit 200. The electronic device 101 may store information related to the external electronic devices 201 and 202 in the EM sensing circuit 200 or the memory 130.

In operation 806, the electronic device 101 may analyze the first information based on the information related to the external electronic devices 201 and 202. The electronic device 101 may analyze the first information to specify a target device which is to perform an operation based on a user's voice input. The electronic device 101 may determine the target device that has emitted an EM signal, using the information related to the external electronic devices 201 and 202.

Figure 9:
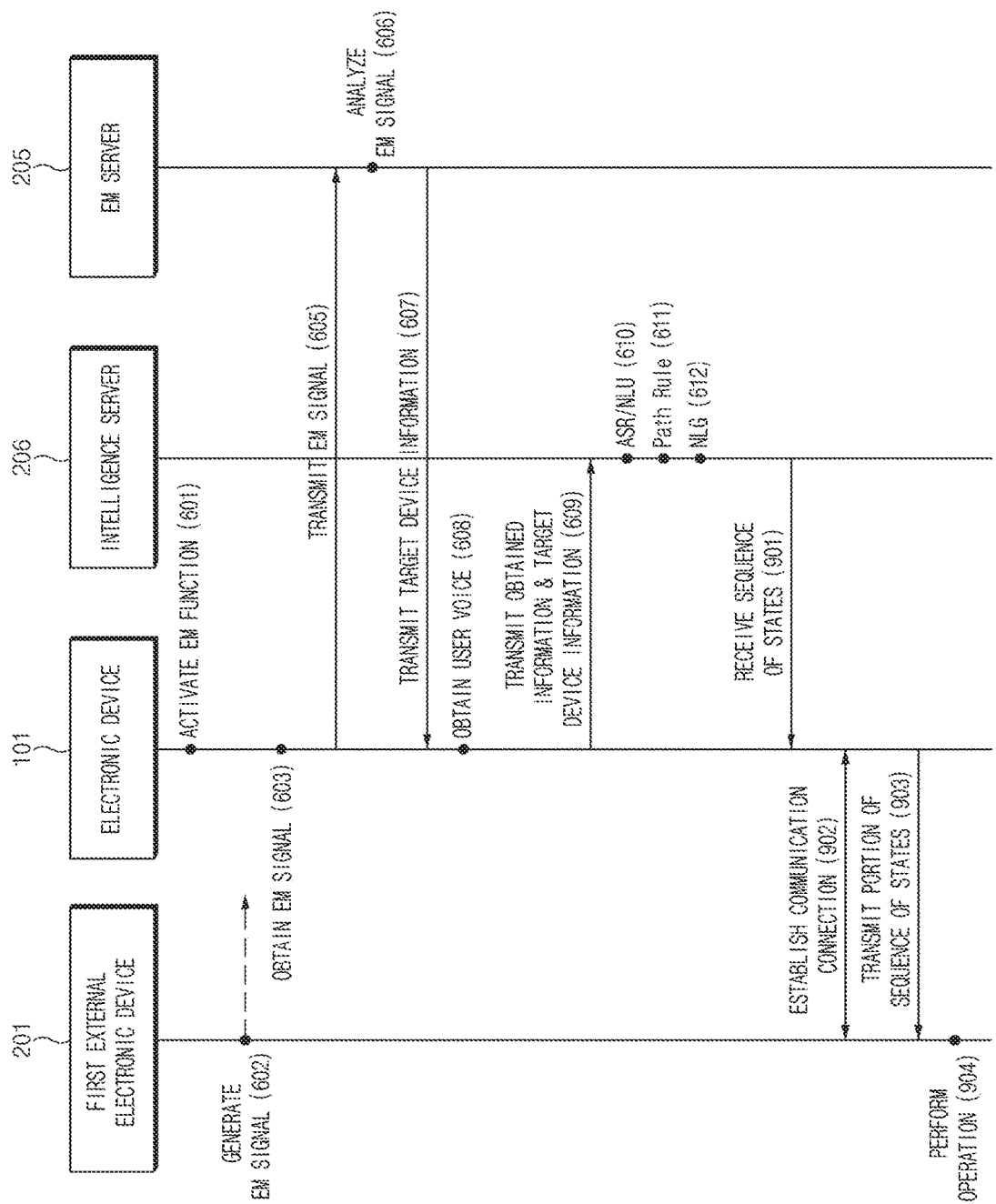
FIG. 9 is a sequence diagram illustrating a control method of an electronic device according to another embodiment.

FIG. 9 is a sequence diagram illustrating a control method of an electronic device according to another embodiment. Since operation 601 to operation 612 illustrated in FIG. 9 are substantially the same as operation 601 to operation 612 described above with reference to FIG. 6, descriptions of operations 601 to 612 provided above with reference to FIG. 6 are referenced.

In operation 901, the electronic device 101 may receive a sequence of states from the intelligence server 206. For example, the electronic device 101 may receive, from the intelligence server 206, the natural language, path rule, and second information specifying a target device (e.g., the first external electronic device 201), which have been generated based on the voice input. The electronic device 101 may transfer, to the processor 120, at least a portion of the voice information, path rule, and domain information received from the voice analysis server 206 via the communication circuit 190. The path rule may be a sequence of states for determining an order of operations of the target device.

In operation 902, the electronic device 101 may establish a communication connection between the electronic device 101 and the target device (e.g., the first external electronic device 201) via the communication circuit 190 at least partially based on the sequence of states. For example, when the wording "connect" is uttered to a speaker by tagging the electronic device 101 to the speaker in order to connect the electronic device 101 to a specified application (Samsung Connect or SmartThings), the electronic device 101 may be connected to the speaker.

The electronic device 101 according to an embodiment may further perform another operation for operation of the target device simultaneously when the target device is specified. For example, the electronic device 101 may perform an operation of confirming whether the target device is a device registered in the specified application (Samsung Connect or SmartThings). In order to confirm whether the target device is a device registered in the specified application (Samsung Connect or SmartThings), the EM server 205 may request a server (e.g., Samsung Connect server), which manages the specified application, to confirm. Alternatively, in order to confirm whether the target device is a device registered in the specified application, the electronic device 101 itself may perform confirmation using the second information received from the EM server 205.

In operation 903, the electronic device 101 may transfer a portion of the sequence of states to the target device (e.g., the first external electronic device 201). The electronic device 101 may transfer, to the first external electronic device 201, information required for the first external electronic device 201 to perform an operation or information associated with operation of the first external electronic device 201 in the sequence of states. For example, the electronic device 101 that has received the voice input "transfer the picture to the notebook computer" may transfer, to the first external electronic device 201, sequence information in the sequence of states, which executes a program for the first external electronic device 201 to receive a picture file.

In operation 904, the first external electronic device 201 may receive a portion of the sequence of states from the electronic device 101, and may perform an operation corresponding to the portion of the sequence of states. The first external electronic device 201 may receive, from the electronic device 101, a portion of the sequence of states, which is information associated with operation of the first external electronic device 201. The first external electronic device 201 may perform an operation instructed by the user by voice in response to pieces of received information.

Figure 10A:
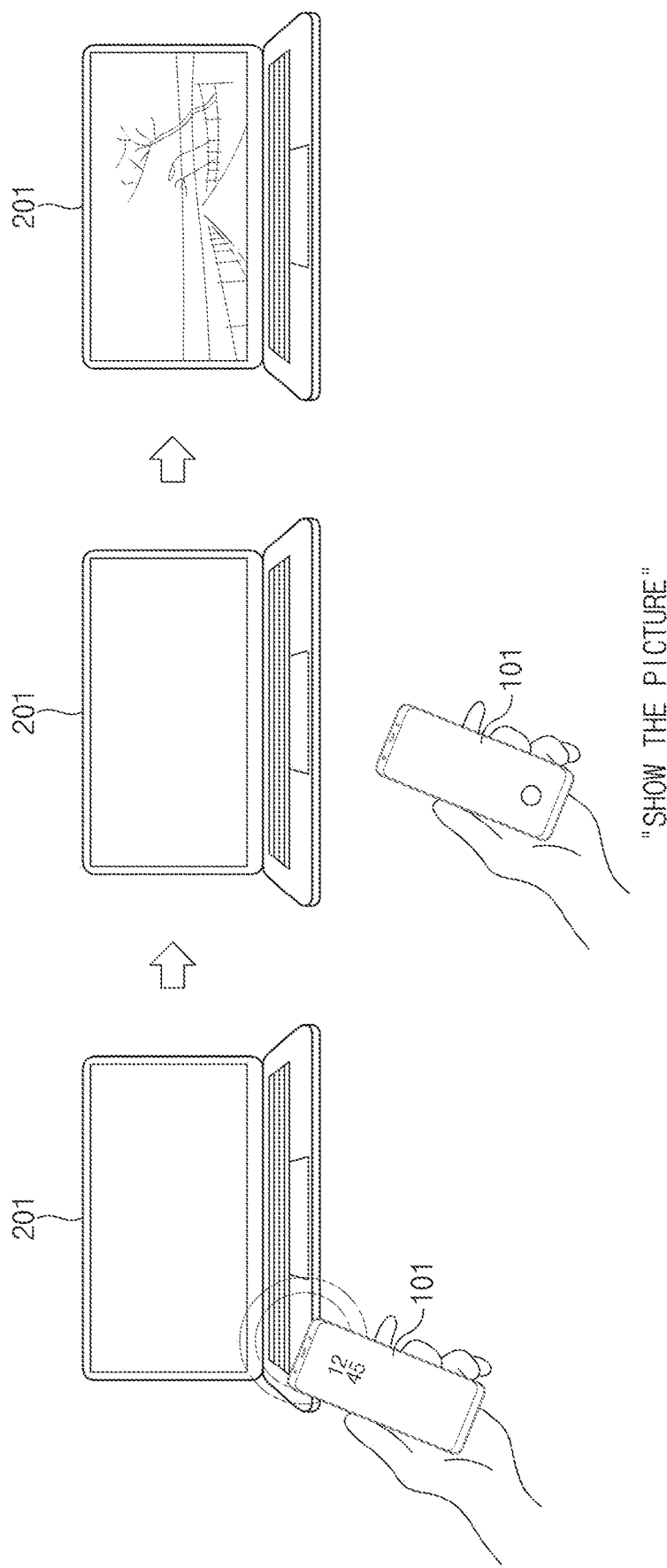
FIG. 10A is a conceptual diagram illustrating that an electronic device according to an embodiment specifies a first external electronic device to transfer a picture thereto.
Figure 10B:
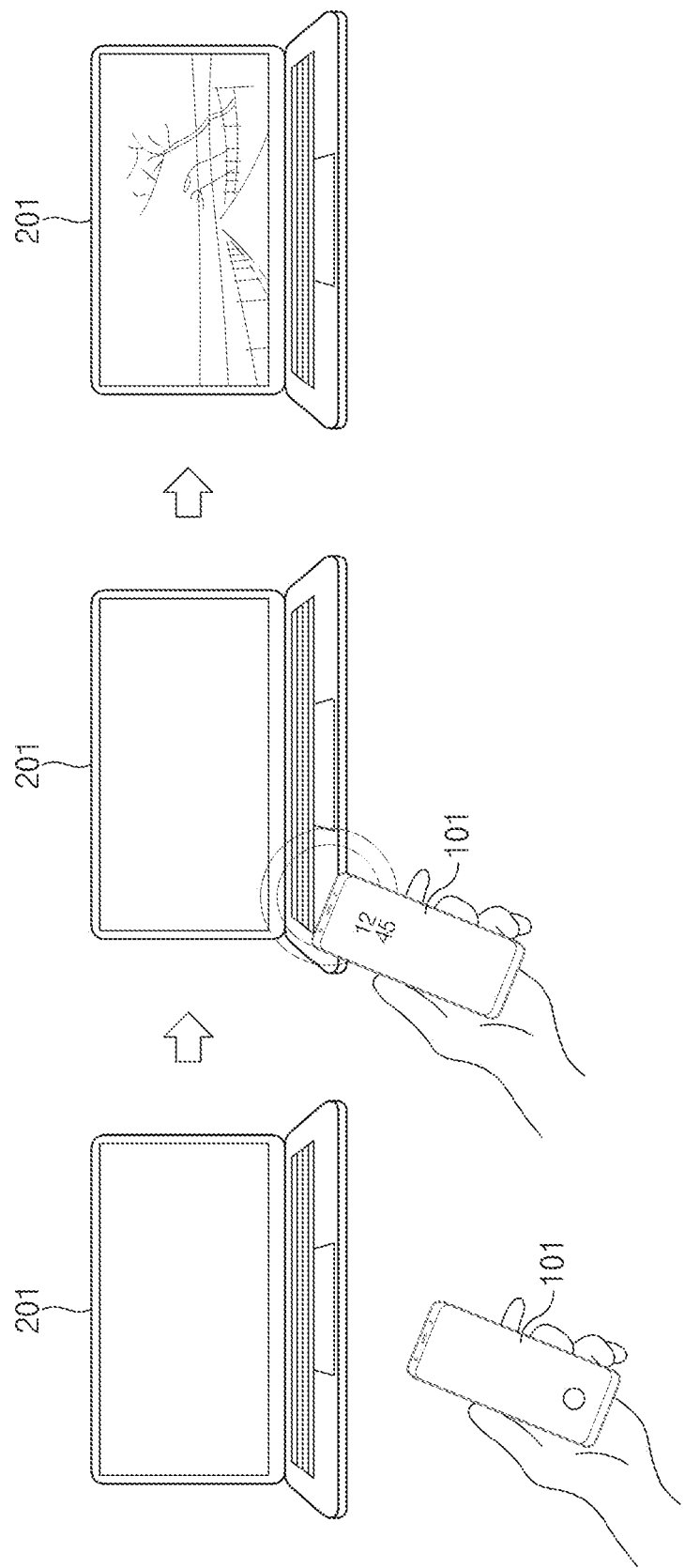
FIG. 10B is a conceptual diagram illustrating that an electronic device according to another embodiment specifies a first external electronic device to transfer a picture thereto.

FIG. 10A is a conceptual diagram illustrating that the electronic device 101 according to an embodiment specifies the first external electronic device 201 to transfer a picture thereto. FIG. 10B is a conceptual diagram illustrating that the electronic device 101 according to another embodiment specifies the first external electronic device 201 to transfer a picture thereto. In FIGS. 10A and 10B, it is assumed that the electronic device 101 is a mobile terminal capable of sensing an EM signal, and the external electronic device 201 is a notebook computer.

In the case of FIG. 10A, the user may perform an operation of tagging the electronic device 101 while bringing the electronic device 101 close to the first external electronic device 201. The electronic device 101 may obtain an EM signal emitted from the first external electronic device 201. The electronic device 101 may analyze the obtained EM signal to confirm that the first electronic device 201 is a notebook computer used by the user. After the electronic device 101 confirms that the first external electronic device 201 is a notebook computer, the user may separate the electronic device 101 from the first external electronic device 201. Thereafter, the user may utter the wording "show me the picture" without specifying a target device. The electronic device 101 may receive the voice input "show me the picture", and may designate, as the target device, the notebook computer confirmed by analyzing an EM signal. The electronic device 101 may perform the same operation as that for the case of receiving the voice input "show me the picture of my mobile phone on the notebook computer" by combining the voice input with a result of specifying through EM signal analysis.

In the case of FIG. 10B, the user may utter the wording "show me the picture" without specifying a target device. Thereafter, the user may perform an operation of tagging the electronic device 101 while bringing the electronic device 101 close to the first external electronic device 201. Also in this case, the electronic device 101 may receive the voice input "show me the picture", and may designate, as the target device, the notebook computer confirmed by analyzing an EM signal. The electronic device 101 may perform the same operation as that for the case of receiving the voice input "show me the picture of my mobile phone on the notebook computer" by combining the voice input with a result of specifying through EM signal analysis.

Hereinafter, an integrated intelligence system to which an embodiment of the present invention is applicable.

Figure 11:
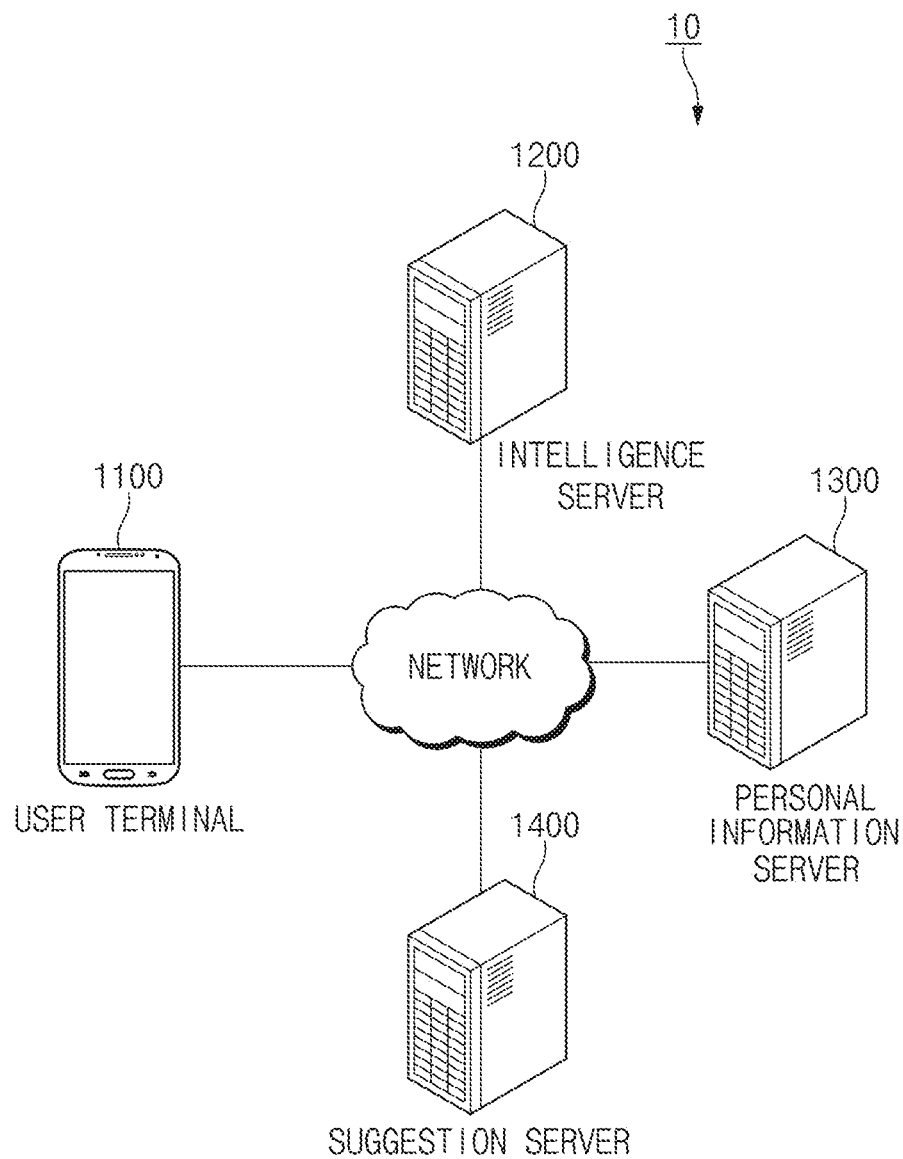
FIG. 11 is a diagram illustrating an integrated intelligence system according to various embodiments.

FIG. 11 is a diagram illustrating an integrated intelligence system according to various embodiments.

Referring to FIG. 11, an integrated intelligence system 10 may include a user terminal 1100, an intelligence server 1200, a personal information server 1300 or a suggestion server 1400.

The user terminal 1100 (e.g., the electronic device 101) may provide a required service to the user through an app (or application program) (e.g., an alarm app, a message app, or a picture (gallery) app) stored in the user terminal 1100. For example, the user terminal 1100 may execute and operate another app through an intelligence app (or speech recognition app) stored in the user terminal 1100. The user terminal 110 may receive a user input for executing and operating the other app through the intelligence app. The user input may be received through, for example, a physical button, a touch input, a voice input, or a remote input. According to an embodiment, the user terminal 1100 may correspond to various terminal devices (or electronic devices) capable of connecting to the Internet, such as a mobile phone, a smartphone, a personal digital assistant (PDA), or a notebook computer.

According to an embodiment, the user terminal 1100 may receive a user's utterance as a user input. The user terminal 1100 may receive the user's utterance, and may generate a command for operating an app based on the user's utterance. Accordingly, the user terminal 1100 may operate the app using the command.

The intelligence server 1200 (e.g., the intelligence server 206) may receive a user voice input from the user terminal 1100 via a communication network, and may convert the user voice input into text data. In another embodiment, the intelligence server 1200 may generate (or select) a path rule based on the text data. The path rule may include information about actions (or operations) for performing a function of an app or information about a parameter required for performing the actions. Furthermore, the path rule may include an order of the actions of the app. The user terminal 1100 may receive the path rule, may select an app according to the path rule, and may perform an action included in the path rule in the selected app.

The term "path rule" used herein may represent, in general, a sequence of states for an electronic device to execute a task requested by the user, but is not limited thereto. In other words, the path rule may include information about a sequence of states. The task may be a certain action that may be provided by the intelligence app. The task may include generating a schedule, transmitting a picture to a desired counterpart, or providing weather information. The user terminal 1100 may sequentially have at last one state (e.g., operation state of the user terminal 1100) to execute the task.

According to an embodiment, the path rule may be provided or generated by an artificial intelligence (AI) system. The artificial intelligence system may be a rule-based system or a neural network-based system (e.g., a feedforward neural network (FNN), a recurrent neural network (RNN)). Alternatively, the artificial intelligence system may be a combination of the foregoing systems or other artificial intelligence systems. According to an embodiment, the path rule may be selected from a set of predefined path rules or may be generated in real time in response to a user request. For example, the artificial intelligence system may select at least one path rule from among a plurality of predefined path rules, or may generates a path rule dynamically (or in real time). Furthermore, the user terminal 1100 may use a hybrid system to provide the path rule.

According to an embodiment, the user terminal 1100 may perform the action, and may display, on a display, a screen corresponding to a state of the user terminal that has performed the action. For another example, the user terminal 1100 may perform the action, but may not display, on the display, a result of performing the action. The user terminal 1100, for example, may perform a plurality of actions, and may display only a portion of results of the actions on the display. The user terminal 1100, for example, may display only a result of performing a last action on the display. For another example, the user terminal 1100 may receive a user input to display a result of performing the action on the display.

The personal information server 1300 may include a database in which user information is stored. For example, the personal information server 1300 may receive user information (e.g., context information or app execution) from the user terminal 1100 and store the user information in the database. The intelligence server 1200 may receive the user information from the personal information server 1300 via a communication network to use the user information when generating a path rule for a user input. According to an embodiment, the user terminal 1100 may receive the user information from the personal information server 1300 to use the user information as information for managing the database.

The suggestion server 1400 may include a database, which stores introduction of a function or application in a terminal or information about a function to be provided. For example, the suggestion server 1400 may include a database about functions available for the user by receiving user information about the user terminal 1100 from the personal information server 1300. The user terminal 1100 may receive, from the suggestion server 1400, the information about a function to be provided via the communication network to provide the information to the user.

Figure 12:
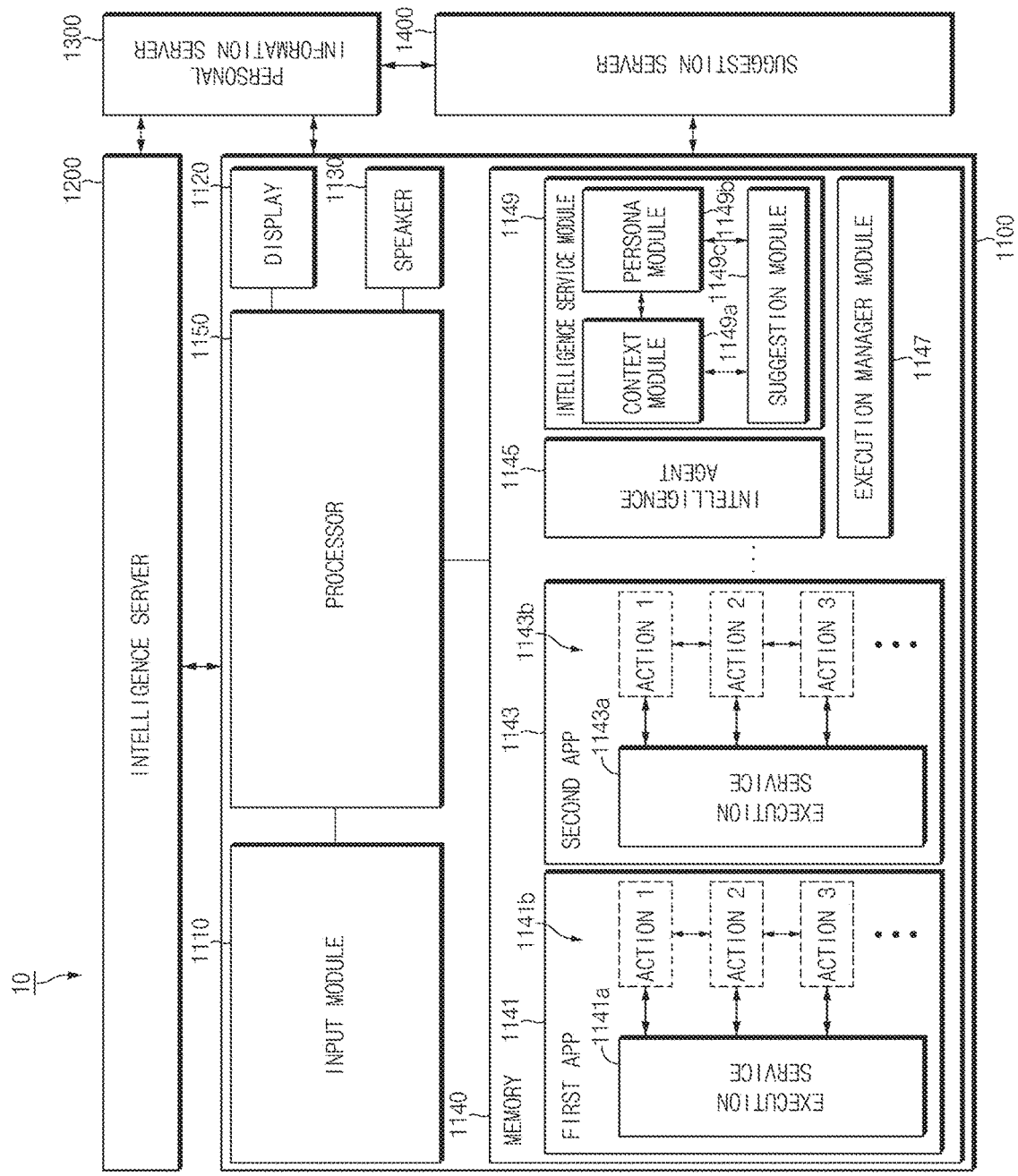
FIG. 12 is a block diagram illustrating a user terminal of an integrated intelligence system according to an embodiment.

FIG. 12 is a block diagram illustrating the user terminal 1100 of the integrated intelligence system 10 according to an embodiment.

Referring to FIG. 12, the user terminal 1100 may include an input module 1110 (e.g., the input device 150), a display 1120 (e.g., the display device 160), a speaker 1130 (e.g., the audio module 170), a memory 1140 (e.g., the memory 130), or a processor 1150 (e.g., the processor 120). The user terminal 1100 may further include a housing, and the above components of the user terminal 1100 may be placed in the housing or may be located on the housing. The user terminal 1100 may further include a communication circuit arranged in the housing. The user terminal 1100 may transmit/receive data (or information) to/from an external server (e.g., the intelligence server 1200) via the communication circuit.

The input module 1110 according to an embodiment may receive a user input from the user. For example, the input module 1110 may receive the user input from an external device (e.g., a keyboard, a headset) connected thereto. For example, the input module 1110 may include a touch screen (e.g., a touch screen display) coupled to the display 1120. For another example, the input module 1110 may include a hardware key (or physical key) arranged on the user terminal 1100 (or the housing of the user terminal 1100).

According to an embodiment, the input module 1110 may include a microphone capable of receiving a user's utterance as a voice signal. For example, the input module 1110 may include a speech input system, and may receive the user's utterance as a voice signal via the speech input system. The microphone may be exposed through, for example, a portion (e.g., a first portion) of the housing.

The display 1120 according to an embodiment may display an execution screen of an image, video, and/or application. For example, the display 1120 may display a graphic user interface (GUI) of an app. According to an embodiment, the display 1120 may be exposed through a portion (e.g., a second portion) of the housing.

According to an embodiment, the speaker 1130 may output a voice signal. For example, the speaker 1130 may output a voice signal generated in the user terminal 1100 to the outside. According to an embodiment, the speaker 1130 may be exposed through a portion (e.g., a third portion) of the housing.

According to an embodiment, the memory 1140 may store a plurality of apps (or application programs) 1141 and 1143. The plurality of apps 1141 and 1143, for example, may be programs for performing a function corresponding to the user input. According to an embodiment, the memory 1140 may include an intelligence agent 1145, an execution manager module 1147, or an intelligence service module 1149. The intelligence agent 1145, the execution manager module 1147, and the intelligence service module 1149, for example, may be a framework (or application framework) for processing a received user input (e.g., user utterance).

According to an embodiment, the memory 1140 may include a database for storing information required for recognizing a user input. For example, the memory 1140 may include a log database for storing log information. For another example, the memory 1140 may include a persona data for storing user information.

According to an embodiment, the memory 1140 may store the plurality of apps 1141 and 1143, and the plurality of apps 1141 and 1143 may be loaded to operate. For example, the plurality of apps 1141 and 1143 stored in the memory 1140 may be loaded by the execution manager module 1147 to operate. The plurality of apps 1141 and 1143 may include execution service modules 1141a and 1143a for performing a function. In an embodiment, the plurality of apps 1141 and 1143 may execute a plurality of actions 1141b and 1143b (e.g., sequence of states) through the execution service modules 1141a and 1413a in order to perform a function. In other words, the execution service modules 1141a and 1143a may be activated by the execution manager module 1147 and may execute the plurality of actions 1141b and 1143b.

According to an embodiment, when the actions 1141b and 1143b of the plurality of apps 1141 and 1143 are executed, an execution state screen according to execution of the actions 1141b and 1143b may be displayed on the display 1120. The execution state screen may be, for example, a screen of a state in which the actions 1141b and 1143b are completed. For another example, the execution state screen may be a screen of a state in which execution of the actions 1141b and 1143b is stopped (partial landing) (e.g., when parameters required for the actions 1141b and 1143b are not input).

According to an embodiment, the execution service modules 1141a and 1143a may execute the actions 1141b and 1143b according to a path rule. For example, the execution service modules 1141a and 1143a may be activated by the execution manager module 1147, may receive an execution request from the execution manager module 1147 according to the path rule, and may execute the actions 1141b and 1143b in response to the execution request so as to perform functions of the plurality of apps 1141 and 1143. When execution of the actions 1141b and 1143b is completed, the execution service modules 1141a and 1143a may transfer completion information to the execution manager module 1147.

According to an embodiment, when the plurality of actions 1141b and 1143b are executed in the plurality of apps 1141 and 1143, the plurality of actions 1141b and 1143b may be sequentially executed. When execution of one action (e.g., action 1 of the first app 1141, action 1 of the second app 1143) is completed, the execution service modules 1141a and 1143a may open a next action (e.g., action 2 of the first app 1141, action 2 of the second app 1143) and may transmit completion information to the execution manager module 1147. Here, opening an arbitrary action may be construed as transitioning to a state in which the arbitrary action is executable or preparing to execute the arbitrary action. In other words, unless an arbitrary action is opened, this action cannot be executed. Upon receiving the completion information, the execution manager module 147, the execution manager module 147 may transfer, to the execution service module, a request for execution of a next action (e.g., action 2 of the first app 1141, action 2 of the second app 1143). According to an embodiment, when the plurality of apps 1141 and 1143 are executed, the plurality of apps 1141 and 1143 may be sequentially executed. For example, when the execution manager module 1147 receives the completion information since execution of a last action (e.g., operation 3 of the first app 1141) of the first app 1141 has been completed, the execution manager module 1147 may transmit, to the execution service 1143a, a request for execution of a first action (e.g., action 1 of the second app 1143) of the second app 1143.

According to an embodiment, when the plurality of actions 1141b and 1143b have been executed in the apps 1141 and 1143, result screens according to execution of each of the plurality of executed actions 1141b and 1143b may be displayed on the display 1120. According to an embodiment, only a portion of the plurality of result screens according to execution of each of the plurality of executed actions 1141b and 1143b may be displayed on the display 1120.

According to an embodiment, the memory 1140 may store an intelligence app (e.g., speech recognition app) associated with the intelligence agent 1145. The app associated with the intelligence agent 1145 may receive a user's utterance as a voice signal to process the voice signal. According to an embodiment, the app associated with the intelligence agent 1145 may be operated by a specific input (e.g., an input through a hardware key, an input through a touch screen, a specific voice input) that is input through the input module 1110.

According to an embodiment, the intelligence agent 1145, the execution manager module 1147, or the intelligence service module 1149 stored in the memory 1140 may be executed by the processor 1150. A function of the intelligence agent 1145, the execution manager module 1147, or the intelligence service module 1149 may be implemented by the processor 1150. The function of the intelligence agent 1145, the execution manager module 1147, or the intelligence service module 1149 will be described as operation of the processor 1150. According to an embodiment, the intelligence agent 1145, the execution manager module 1147, or the intelligence service module 1149 stored in the memory 1140 may be implemented not only as software but also as hardware.

According to an embodiment, the processor 1150 may control overall operation of the user terminal 1100. For example, the processor 1150 may receive a user input by controlling the input module 1110. The processor 1150 may display an image by controlling the display 1120. The processor 1150 may output a voice signal by controlling the speaker 1130. The processor 1150 may execute a program and load or store required information by controlling the memory 1140.

According to an embodiment, the processor 1150 may execute the intelligence agent 1145, the execution manager module 1147, or the intelligence service module 1149 stored in the memory 1140. Accordingly, the processor 1150 may execute the function of the intelligence agent 1145, the execution manager module 1147, or the intelligence service module 1149.

The processor 1150 according to an embodiment may execute the intelligence agent 1145 to generate a command for operating an app based on a voice signal received as a user input. The processor 1150 according to an embodiment may execute the execution manager module 1147 to execute the plurality of apps 1141 and 1143 stored in the memory 1140 according to the generated command. According to an embodiment, the processor 1150 may execute the intelligence service module 1149 to manage user information and process a user input using the user information.

The processor 1150 may execute the intelligence agent 1145 to transmit the user input received through the input module 1110 to the intelligence server 1200 and process the user input through the intelligence server 1200.

According to an embodiment, the processor 1150 may execute the intelligence agent 1145 to pre-process the user input before transmitting the user input to the intelligence server 1200. According to an embodiment, in order to pre-process the user input, the intelligence agent 1145 may include an adaptive echo canceller (AEC) module, a noise suppression (NS) module, an end-point detection (EPD) module, or an automatic gain control (AGC) module. The adaptive echo canceller module may remove an echo included in the user input. The noise suppression module may suppress background noise included in the user input. The end-point detection module may detect an end point of a user voice included in the user input, and may discover a portion in which the user voice is present using the detected end point. The automatic gain control unit may recognize the user input, and may adjust a sound volume of the user input so as to render the user input suitable for processing. According to an embodiment, the processor 1150 may execute all of the above pre-processing components for performance, but, in another embodiment, the processor 1150 may execute a portion of the pre-processing components in order to operate at low power.

According to an embodiment, the intelligence agent 1145 may execute a wake-up recognition module stored in the memory 1140 in order to recognize a call from the user. Accordingly, the processor 1150 may recognize a wake-up command of the user through the wake-up recognition module, and, upon receiving the wake-up command, may execute the intelligence agent 145 for receiving a user input. The wake-up recognition module may be implemented with a low-power processor (e.g., a processor included in an audio codec). According to an embodiment, the processor 1150 may execute the intelligence agent 1145 upon receiving a user input through a hardware key. When the intelligence agent 1145 is executed, an intelligence app (e.g., speech recognition app) associated with the intelligence agent 1145 may be executed.

According to an embodiment, the intelligence agent 1145 may include a speech recognition module for executing a user input. The processor 1150 may recognize a user input for executing an action in an app through the speech recognition module. For example, the processor 1150 may recognize, through the speech recognition module, a limited user (voice) input (e.g., uttered word such as "Click" that executes an image capture operation when a camera app is running) which executes an action such as the wake-up command in the plurality of apps 1141 and 1143. The processor 1150 may assist the intelligence server 1200 to recognize and quickly process a user command processable in the user terminal 1100 through the speech recognition module. According to an embodiment, the speech recognition module of the intelligence agent 1145 for executing a user input may be implemented in an app processor.

According to an embodiment, the speech recognition module (including a speech recognition module of the wake-up module) of the intelligence agent 1145 may recognize a user input using an algorithm for recognizing a voice. The algorithm used for recognizing a voice may be, for example, at least one of a hidden markov model (HMM) algorithm, an artificial neural network (ANN) algorithm, or a dynamic time warping (DTW) algorithm.

According to an embodiment, the processor 1150 may execute the intelligence agent 1145 to convert a user's voice input into text data. For example, the processor 1150 may transmit a user's voice to the intelligence server 1200 via the intelligence agent 1145, and may receive text data corresponding to the user's voice from the intelligence server 1200. Accordingly, the processor 1150 may display the conversion-result text data on the display 1120.

According to an embodiment, the processor 1150 may execute the intelligence agent 1145 to receive a path rule from the intelligence server 1200. According to an embodiment, the processor 1150 may transfer the path rule to the execution manager module 1147 via the intelligence agent 1145.

According to an embodiment, the processor 1150 may execute the intelligence agent 1145 to transfer, to the intelligence service module 1149, an execution result log according to the path rule received from the intelligence server 1200, wherein the transferred execution result log may be managed by being accumulated in user's preference information of a persona module 1149*b*.

The processor 1150 according to an embodiment may execute the execution manager module 1147 to receive a path rule from the intelligence agent 1145 to execute the plurality of apps 1141 and 1143, and may make the plurality of apps 1141 and 1143 execute the actions 1141*b* and 1143*b* included in the path rule. For example, the processor 1150 may transmit command information (e.g., path rule information) for executing the actions 1141*b* and 1143*b* to the apps 1141 and 1143 via the execution manager module 1147, and may receive completion information about the actions 1141*b* and 1143*b* from the plurality of apps 1141 and 1143.

According to an embodiment, the processor 1150 may execute the execution manager module 1147 to transfer the command information (e.g., path rule information) for executing the actions 1141*b* and 1143*b* of the plurality of apps 1141 and 1143 between the intelligence agent 1145 and the plurality of apps 1141 and 1143. The processor 1150 may bind the plurality of apps 1141 and 1143 to be executed according to the path rule through the execution manager module 1147, and may transfer the command information (e.g., path rule information) about the actions 1141*b* and 1143*b* included in the path rule to the plurality of apps 1141 and 1143. For example, the processor 1150 may sequentially transfer the actions 1141*b* and 1143*b* included in the path rule to the plurality of apps 1141 and 1143 through the execution manager module 1147 so as to sequentially execute the actions 1141*b* and 1143*b* of the plurality of apps 1141 and 1143 according to the path rule.

According to an embodiment, the processor 1150 may execute the execution manager module 1147 to manage an execution state of the actions 1141*b* and 1143*b* of the plurality of apps 1141 and 1143. For example, the processor 1150 may receive, from the plurality of apps 1141 and 1143, information about the execution state of the actions 1141*b* and 1143*b* via the execution manger module 1147. When the execution state of the actions 1141*b* and 1143*b* is, for example, a stopped state (partial landing) (e.g., when parameters required for the actions 1141*b* and 1143*b* are not input), the processor 1150 may transfer information about the stopped state to the intelligence agent 1145 via the execution manager module 1147. The processor 1150 may request the user to input required information (e.g., parameter information) using the received information through the intelligence agent 1145. For another example, when the execution state of the actions 1141*b* and 1143*b* is an operational state, the processor 1150 may receive an utterance from the user via the intelligence agent 1145. The processor 1150 may transfer, to the intelligence agent 1145, information about the plurality of running apps 1141 and 1143 and the execution state of the plurality of apps 1141 and 1143 via the execution manager module 1145. The processor 1150 may transmit the user utterance to the intelligence server 1200 via the intelligence agent 1145. The processor 1150 may receive parameter information about the user utterance from the intelligence server 1200 via the intelligence agent 1145. The processor 1150 may transfer the received parameter information to the execution manager module 1147 via the intelligence agent 1145. The execution manager module 1147 may change a parameter of the actions 1141*b* and 1143*b* into a new parameter using the received parameter information.

According to an embodiment, the processor 1150 may execute the execution manager module 1147 to transfer parameter information included in a path rule to the plurality of apps 1141 and 1143. When the plurality of apps 1141 and 1143 are sequentially executed according to the path rule, the execution manage module 1147 may transfer the parameter information included in the path rule from one app to another app.

According to an embodiment, the processor 1150 may execute the execution manager module 1147 to receive a plurality of path rules. The processor 1150 may select the plurality of path rules based on a user's utterance through the execution manager module 1147. For example, when the user's utterance specifies a partial app 1141 which is to execute a partial action 1141*a* but does not specify another app 1143 which is to execute the remaining action 1143*b*, the processor 1150 may receive a plurality of different path rules in which the same app 1141 (e.g., a gallery app) for executing the partial action 1141*a* is executed and different apps 1143 (e.g., a message app, telegram app) capable of executing the remaining action 1143*b* are executed, through the execution manager module 1147. The processor 1150, for example, may execute the same actions 1141*b* and 1143*b* (e.g., continuous same actions 1141*b* and 1143*b*) of the plurality of path rules through the execution manager module 1147. When the processor 1150 has executed up to the same actions, the processor 1150 may display, on the display 1120, a state screen for selecting a plurality of different apps 1141 and 1143 respectively included in the plurality of path rules through the execution manager module 1147.

According to an embodiment, the intelligence service module 1149 may include a context module 1149a, the persona module 1149b, or a suggestion module 1149c.

The processor 1150 may execute the context module 1149a to collect a current state of the plurality of apps 1141 and 1143 from the plurality of apps 1141 and 1143. For example, the processor 1150 may execute the context module 1149a to receive context information indicating the current state of the plurality of apps 1141 and 1143 and collect the current state of the apps 1141 and 1143 through the received context information.

The processor 1150 may execute the persona module 1149b to manage personal information about the user who uses the user terminal 1100. For example, the processor 1150 may execute the persona module 1149b to collect usage information and an execution result of the user terminal 1100, and manage the personal information about the user using the usage information and the execution result.

The processor 1150 may execute the suggestion module 1149c to predict an intent of the user, and may recommend a command to the user based on the intent of the user. For example, the processor 1150 may execute the suggestion module 1149c to recommend a command to the user according to a current state (e.g., time, place, situation, app) of the user.

Figure 13:
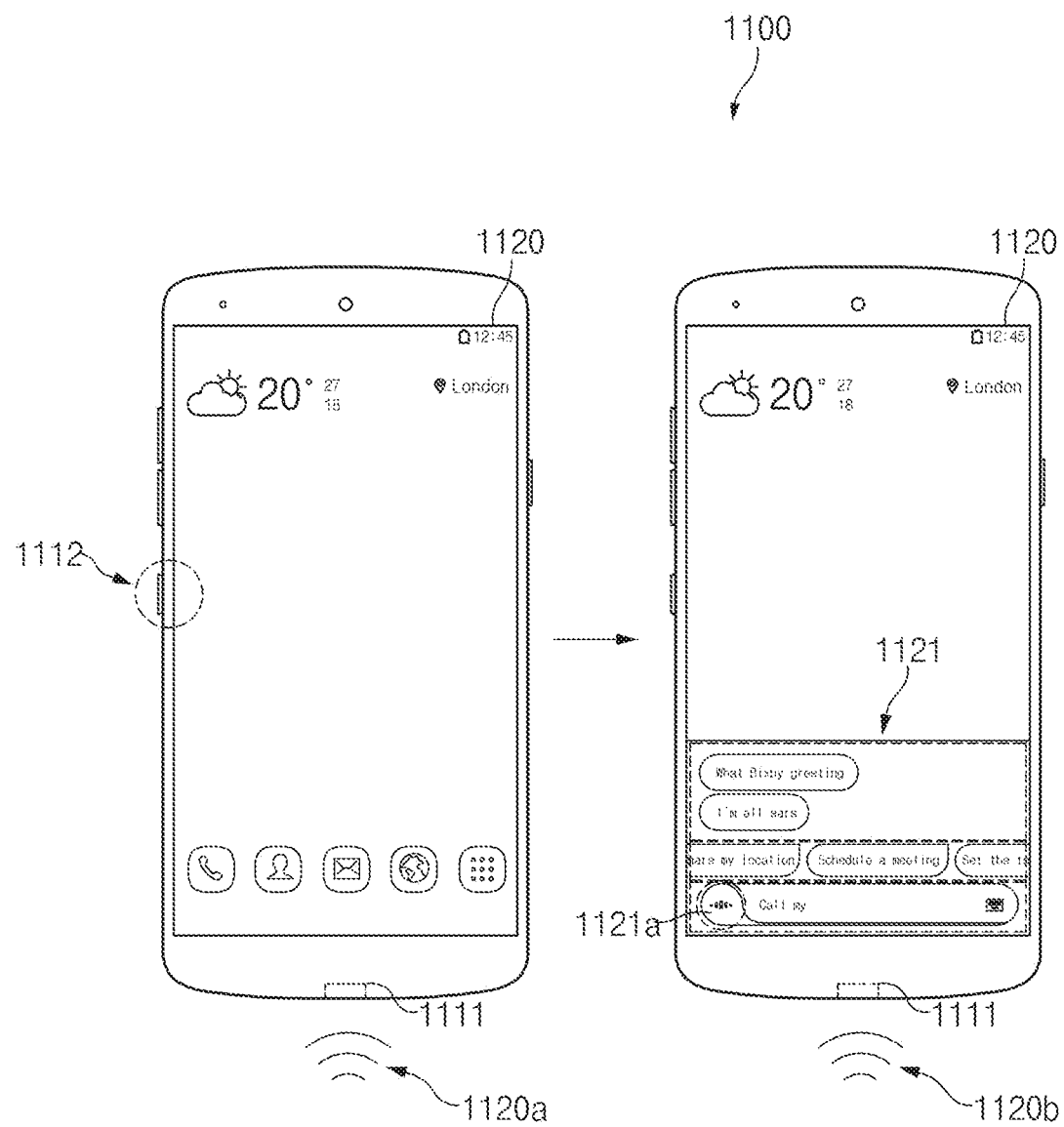
FIG. 13 is a diagram illustrating execution of an intelligence app of a user terminal according to an embodiment.

FIG. 13 is a diagram illustrating execution of an intelligence app of a user terminal according to an embodiment.

FIG. 13 illustrates that the user terminal 1100 receives a user input to execute an intelligence app (e.g., speech recognition app) associated with the intelligence agent 1145.

According to an embodiment, the user terminal 1100 may execute an intelligence app for recognizing a voice through the hardware key 1112. For example, when a user input is received through the hardware key 1112, the user terminal 1100 may display a user interface (UI) 1121 of the intelligence app on the display 1120. The user, for example, may touch a voice recognition button 1121a on the UI 1121 of the intelligence app in order to input (1120b) a voice while the UI 1121 of the intelligence app is displayed on the display 1120. For another example, the user may press and hold the hardware key 1112 in order to input (1120b) a voice.

According to an embodiment, the user terminal 1100 may execute the intelligence app for recognizing a voice through the microphone 1111. For example, when a specified voice (e.g., "Wake up!") is input through the microphone 1111, the user terminal 1100 may display the UI 1121 of the intelligence app on the display 1120.

Figure 14:
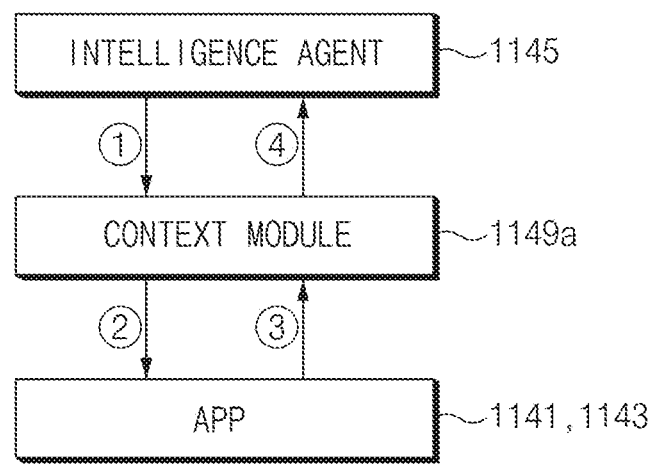
FIG. 14 is a diagram illustrating that a context module of an intelligence module according to an embodiment collects a current state.

FIG. 14 is a diagram illustrating that a context module of an intelligence module according to an embodiment collects a current state.

Referring to FIG. 14, when the processor 1150 receives a context request from the intelligence agent 1145 (①), the processor 1150 may request context information indicating the current state of the plurality of apps 1141 and 1143 through the context module 1149a (②). According to an embodiment, the processor 1150 may receive the context information from the plurality of apps 1141 and 1143 via the context module 1149a (③), and may transmit the context information to the intelligence agent 1145 (④).

According to an embodiment, the processor 1150 may receive a plurality of pieces of context information from the plurality of apps 1141 and 1143 through the context module 1149a. The context information, for example, may be information about an app that has been most recently executed. The context information, for example, may be information about a current state in the plurality of apps 1141 and 1143 (e.g., when viewing a picture in a gallery, information about the picture).

According to an embodiment, through the context module 1149a, the processor 1150 may receive not only context information from the plurality of apps 1141 and 1143 but also context information indicating the current state of the user terminal 1100 from a device platform. This context information may include general context information, user context information, or device context information.

The general context information may include general information about the user terminal 1100. The general context information may be confirmed through an internal algorithm of data received via a sensor hub of the device platform. For example, the general context information may include current spatiotemporal information. The current spatiotemporal information may include, for example, a current time or information about a current location of the user terminal 1100. The current time may be confirmed through a time on the user terminal 1100, and the information about the current location may be confirmed through a global positioning system (GPS). For another example, the general context information may include information about a physical motion. The information about a physical motion may include, for example, information about walking, running, or driving. The information about a physical motion may be confirmed through a motion sensor. With regard to the information about driving, driving may be conformed through the motion sensor, and, furthermore, boarding or parking may be confirmed by detecting a Bluetooth connection in a vehicle. For another example, the general context information may include user activity information. The user activity information may include, for example, information about commuting, shopping, or traveling. The user activity information may be confirmed using information about a place registered in a database by the user or an app.

The user context information may include information about the user. For example, the user context information may include information about an emotional state of the user. The information about an emotional state may include, for example, information about happiness, sadness, or anger of the user. For another example, the user context information may include information about a current state of the user. The information about a current state may include, for example, information about an interest or intent (e.g., shopping).

The device context information may include information about a state of the user terminal 1100. For example, the device context information may include information about a path rule executed by the execution manager module 1147. For another example, the device information may include information about a battery. The information about a battery, for example, may be confirmed through a charging and discharging state of the battery. For another example, the device information may include information about a connected device and network. The information about a connected device, for example, may be confirmed through a communication interface to which the device is connected.

Figure 15:
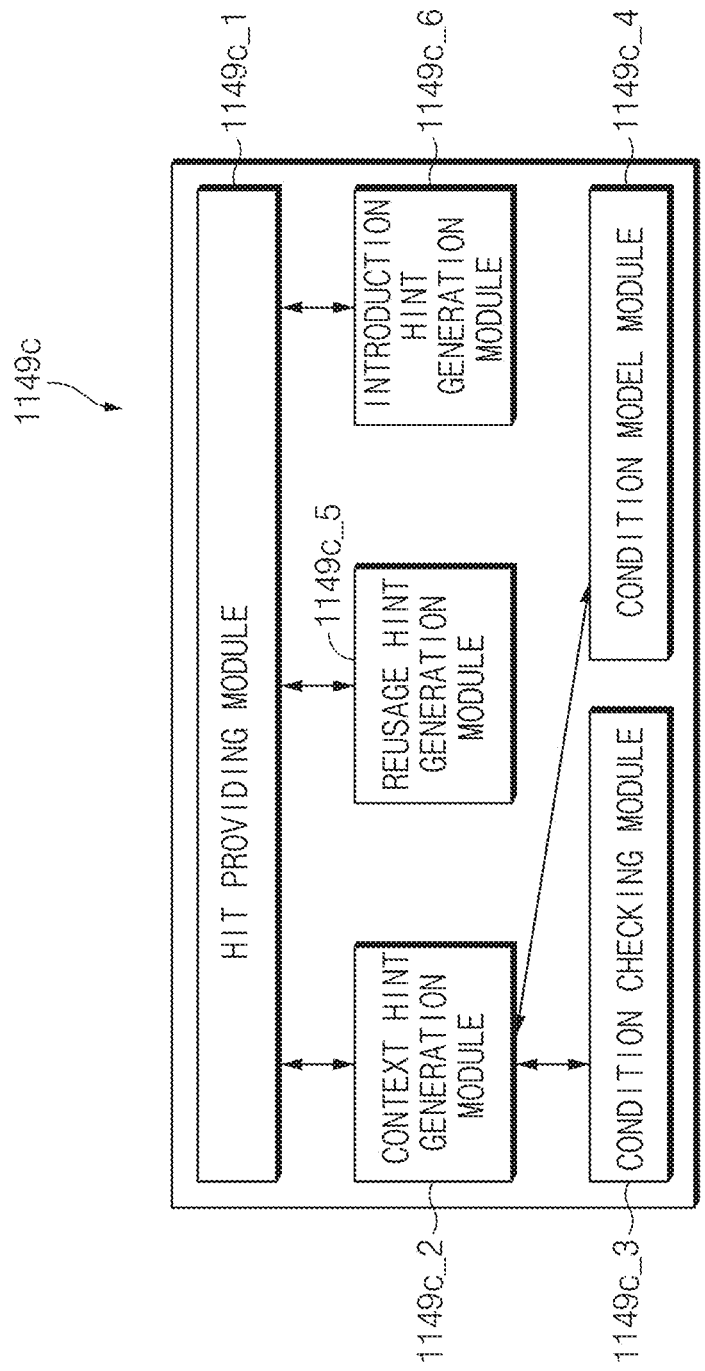
FIG. 15 is a block diagram illustrating a suggestion module of an intelligence service module according to an embodiment.

FIG. 15 is a block diagram illustrating a suggestion module of an intelligence service module according to an embodiment of the present invention.

Referring to FIG. 15, the suggestion module 1149c may include a hint providing module 1149c_1, a context hint generation module 1149c_2, a condition checking module 1149c_3, a condition model module 1149c_4, a reusage hint generation module 1149c_5, or an introduction hint generation module 1149c_6.

According to an embodiment, the processor 1150 may execute the hint providing module 1149c_1 to provide a hint to the user. For example, the processor 1150 may receive a hint generated from the context hint generation module 1149c_2, the reusage hint generation module 1149c_5, or the introduction hint generation module 1149c_6 via the hint providing module 1149c_1 to provide the hint to the user.

According to an embodiment, the processor 1150 may execute the condition checking module 1149c_3 or the condition model module 1149c_4 to generate a hint that may be recommended according to a current state. The processor 1150 may execute the condition checking module 1149c_3 to receive information corresponding to the current state, and may execute the condition model module 1149c_4 to configure a condition model using the received information. For example, the processor 1150 may execute the condition model module 1149c_1 to recognize an app being used at the time or in a location or situation when providing a hint to the user, so as to provide hints that are highly likely to be used in the corresponding condition in descending order of priority.

According to an embodiment, the processor 1150 may execute the reusage hint generation module 1149c_5 to generate a hint that may be recommended according to a frequency of usage. For example, the processor 1150 may execute the reusage hint generation module 1149c_5 to generate a hint based on a usage pattern of the user. According to an embodiment, the introduction hint generation module 1149c_6 may generate a hint for introducing a new function or functions frequently used by other users to the user. For example, the hint for introducing a new function may include an introduction (e.g., operation method) to the intelligence agent 1145.

According to another embodiment, the context hint generation module 1149c_2, the condition checking module 1149c_3, the condition model module 1149c_4, the reusage hint generation module 1149c_5, or the introduction hint generation module 1149c_6 of the suggestion module 1149c may be included in the personal information server 1300. For example, the processor 1150 may receive a hint from the context hint generation module 1149c_2, the reusage hint generation module 1149c_5, or the introduction hint generation module 1149c_6 of the personal information server 1300 via the hint providing module 1149c_1 of the suggestion module 1149c to provide the hint to the user.

According to an embodiment, the user terminal 1100 may provide a hint according to the following series of processes. For example, upon receiving a hint providing request from the intelligence agent 1145, the processor 1150 may transfer a hint generation request to the context hint generation module 1149c_2 via the hint providing module 1149c_1. When the hint generation request is received, the processor 1150 may receive information corresponding to a current state from the context module 1149a and the persona module 1149b via the condition checking module 1149c_3. The processor 1150 may transfer the received information to the condition model module 1149c_4 via the condition checking module 1149c_3, and may prioritize hints that are provided to the user in descending order of likelihood that they will be used in the above condition, using the above information through the condition model module 1149c_4. The processor 1150 may confirm the condition through the context hint generation module 1149c_2, and may generate a hint corresponding to the current state. The processor 1150 may transfer the generated hint to the hint providing module 1149c_1 via the context hint generation module 1149c_2. The processor 1150 may sort the hints according to a specified rule through the hint providing module 1149c_1 and may transfer the hints to the intelligence agent 1145.

According to an embodiment, the processor 1150 may generate a plurality of context hints through the hint providing module 1149c_1, and may prioritize the plurality of context hints according to a specified rule. According to an embodiment, the processor 1150 may preferentially provide, to the user, a hint having a high priority among the plurality of context hints through the hint providing module 1149c_1.

According to an embodiment, the user terminal 1100 may suggest a hint according to a frequency of usage. For example, when the hint providing request is received from the intelligence agent 1145, the processor 1150 may transfer the hint generation request to the reusage hint generation module 1149c_5 via the hint providing module 1149c_1. When the hint generation request is received, the processor 1150 may receive user information from the persona module 1149b via the reusage hint generation module 1149c_5. For example, the processor 1150 may receive, via the reusage hint generation module 1149c_5, a path rule included in user's preference information of the persona module 1149b, a parameter included in the path rule, an execution frequency of an app, and information about a time and space in which an app has been used. The processor 1150 may generate a hint corresponding to the received user information through the reusage hint generation module 1149c_5. The processor 1150 may transfer the generated hint to the hint providing module 1149c_1 via the reusage hint generation module 1149c_5. The processor 1150 may sort the hint through the hint providing module 1149c_1 and may provide the hint to the intelligence agent 1145.

According to an embodiment, the user terminal 1100 may suggest a hint for a new function. For example, when the hint providing request is received from the intelligence agent 1145, the processor 1150 may transfer the hint generation request to the introduction hint generation module 1149c_6 via the hint providing module 1149c_1. The processor 1150 may transfer the hint providing request to the suggestion server 1400 via the introduction hint generation module 1149c_6 and may receive information about a function to be introduced from the suggestion server 1400. The suggestion server 1400, for example, may store information about a function to be introduced, wherein a hint list for the function to be introduced may be updated by a service operator. The processor 1150 may transfer the generated hint to the hint providing module 1149c_1 via the introduction hint generation module 1149c_6. The processor 1150 may sort the hint through the hint providing module 1149c_1 and may transmit the hint to the intelligence agent 1145.

Accordingly, the processor 1150 may provide, to the user, a hint generated by the context hint generation module 1149c_2, the reusage hint generation module 1149c_5, or the introduction hint generation module 1149c_6 via the suggestion module 1149c. For example, the processor 1150 may display, through the suggestion module 1149c, the generated hint on an app operating the intelligence agent 1145, and may receive, through the app, an input for selecting the hint from the user.

Figure 16:
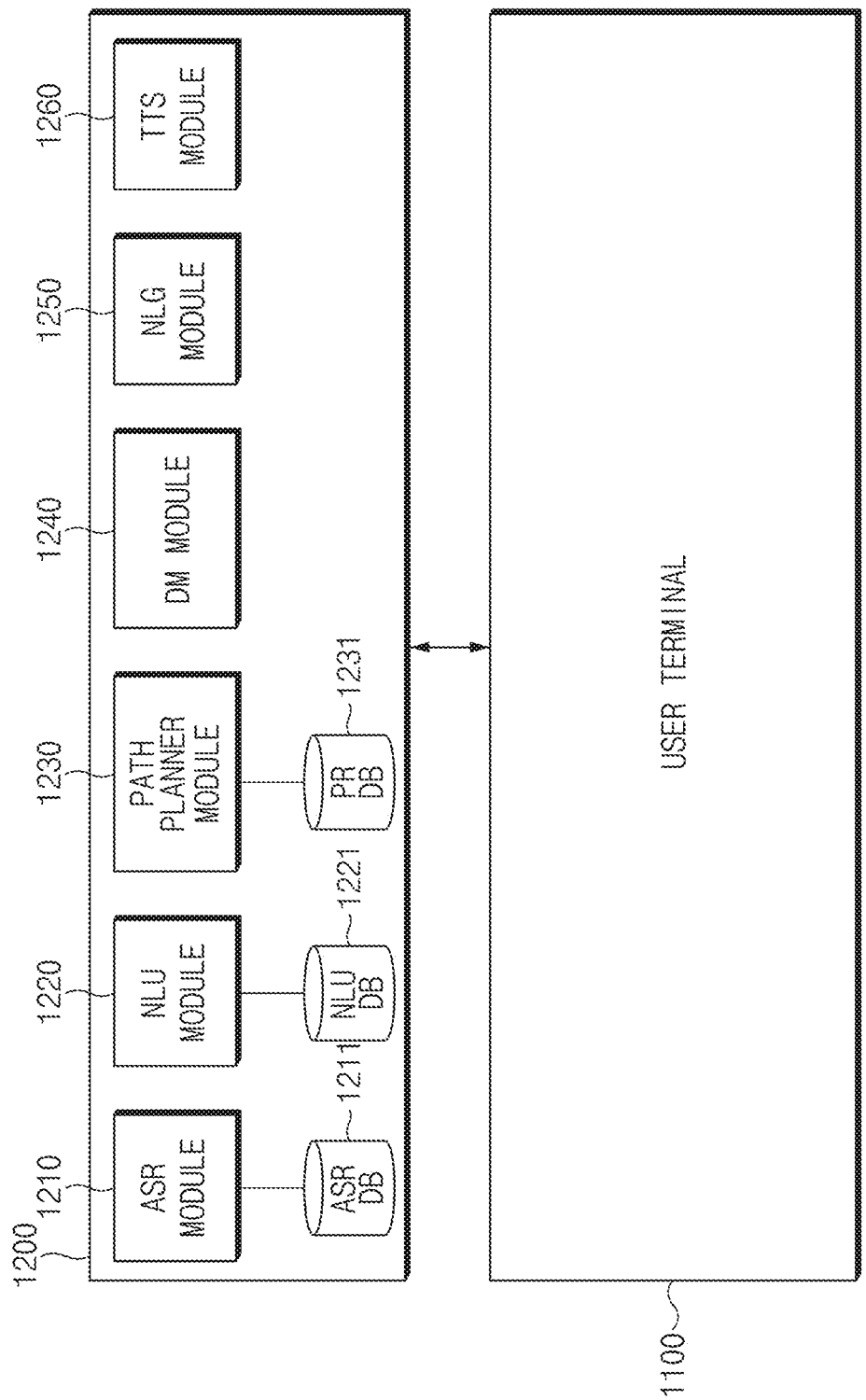
FIG. 16 is a block diagram illustrating an intelligence server of an integrated intelligence system according to an embodiment.

FIG. 16 is a block diagram illustrating an intelligence server of an integrated intelligence system according to an embodiment of the present invention.

Referring to FIG. 16, the intelligence server 1200 may include an automatic speech recognition (ASR) module 1210, a natural language understanding (NLU) module 1220, a path planner module 1230, a dialogue manager (DM) module 1240, a natural language generator (NLG) module 1250, or a text-to-speech (TTS) module 1260. According to an embodiment, the intelligence server 100 may include a communication circuit, a memory, and a processor. The processor may drive the automatic speech recognition module 1210, the natural language understanding module 1220, the path planner module 1230, the dialogue manager module 1240, the natural language generator NLG module 1250, and the text-to-speech module 1260 by executing instructions stored in the memory. The intelligence server 1200 may transmit/receive data (or information) to/from an external electronic device (e.g., the user terminal 1100) via the communication circuit.

The natural language understanding module 1220 or the path planner module 1230 of the intelligence server 1200 may generate a path rule.

According to an embodiment, the automatic speech recognition module (ASR) 1210 may convert a user input received from the user terminal 1100 into text data.

According to an embodiment, the automatic speech recognition module 1210 may convert a voice input received from the user terminal 1100 into text data. For example, the automatic speech recognition module 1210 may include an utterance recognition module. The utterance recognition module may include an acoustic model and a language model. For example, the acoustic model may include vocalization-related information, and the language model may include unit phoneme information and information about a combination of the unit phoneme information. The utterance recognition module may convert a user utterance into text data by using information about the unit phoneme information and the vocalization-related information. Information about the acoustic model and language model may be stored, for example, in an automatic speech recognition database (ASR DB) 1211.

According to an embodiment, the natural language understanding module 1220 may recognize a user intent by performing syntactic analysis or semantic analysis. The syntactic analysis may divide a user input into syntactic units (e.g., words, phrases, or morphemes), and may identify syntactic elements of the divided units. The semantic analysis may be performed using semantic matching, rule matching, or formula matching. Accordingly, the natural language understanding module 1220 may recognize which domain or intent the user input corresponds to or may acquire a parameter (or slot) required for expressing the intent.

According to an embodiment, the natural language understanding module 1220 may determine the parameter and the intent of the user using a matching rule divided into a domain, an intent, and a parameter (or slot) required for expressing the intent. For example, one domain (e.g., alarm) may include a plurality of intents (e.g., alarm setting or alarm disabling), and one intent may include a plurality of parameters (e.g., time, the number of repetitions, or alarm sound). A plurality of rules may include, for example, at least one essential element parameter. The matching rule may be stored in a natural language understanding database (NLU DB) 1221.

According to an embodiment, the natural language understanding module 1220 may recognize a meaning of a word extracted from a user input using a linguistic feature (e.g., syntactic element) such as a morpheme or phrase, and may match the recognized meaning to a domain and intent to determine the intent of the user. For example, the natural language understanding module 1220 may determine the intent of the user by calculating how many words extracted from the user input are included in each domain and intent. According to an embodiment, the natural language understanding module 1220 may determine the parameter of the user input using a word on which recognition of the intent has been based. According to an embodiment, the natural language understanding module 1220 may determine the intent of the user using the natural language understanding database 1221, which stores a linguistic feature for recognizing the intent of a user input. According to another embodiment, the natural language understanding module 1220 may determine the intent of the user using a personal language model (PLM). For example, the natural language understanding module 1220 may determine the intent of the user using personal information (e.g., contact list, music list). The personal language model may be stored, for example, in the natural language understanding database 1221. According to an embodiment, not only the natural language understanding module 1220 but also the automatic speech recognition module 1210 may reference the personal language model stored in the natural language understanding database 1221 to recognize a user's speech.

According to an embodiment, the natural language understanding module 1220 may generate a path rule based on the parameter and the intent of the user input. For example, the natural language understanding module 1220 may select an app to be executed based on the intent of the user input, and may determine an action to be executed in the selected app. The natural language understanding module 1220 may generate a path rule by determining a parameter corresponding to the determined action. According to an embodiment, the path rule generated by the natural language understanding module 1220 may include information about an app to be executed, an action (e.g., at least one state) to be executed in the app, and a parameter required for executing the action.

According to an embodiment, the natural language understanding module 1220 may generate one path rule or a plurality of path rules based on the parameter and the intent of the user input. For example, the natural language understanding module 1220 may receive a path rule set corresponding to the user terminal 1100 from the path planner module 1230 and may map the parameter and the intent of the user input to the received path rule set so as to determine the path rule.

According to another embodiment, the natural language understanding module 1220 may generate one path rule or a plurality of path rules by determining an app to be executed, an action to be executed in the app, and a parameter required for executing the action based on the parameter and the intent of the user input. For example, the natural language understanding module 1220 may generate the path rule by arranging the app to be executed and the action to be executed in the app in a form of ontology or graph model according to the intent of the user using information about the user terminal 1100. The generated path rule may be stored, for example, in a path rule database (PR DB) 1231 via the path planner module 1230. The generated path rule may be added to the path rule set of the database 1231.

According to an embodiment, the natural language understanding module 1220 may select at least one path rule from among a plurality of generated path rules. For example, the natural language understanding module 1220 may select an optimum path rule from among the plurality of path rules. For another example, the natural language understanding module 1220 may select a plurality of rules when only a partial action is specified based on a user utterance. The natural language understanding module 1220 may determine one path rule among the plurality of path rules based on an additional input from the user.

According to an embodiment, the natural language understanding module 1220 may transmit a path rule to the user terminal 1100 in response to a request of the user input. For example, the natural language understanding module 1220 may transmit one path rule corresponding to the user input to the user terminal 1100. For another example, the natural language understanding module 1220 may transmit a plurality of path rules corresponding to the user input to the user terminal 1100. For example, when only a partial action is specified based on a user utterance, the plurality of path rules may be generated by the natural language understanding module 1220.

According to an embodiment, the path planner module 1230 may select at least one path rule from among a plurality of path rules.

According to an embodiment, the path planner module 1230 may transfer a path rule set including a plurality of path rules to the natural language understanding module 1220. The plurality of path rules of the path rule set may be stored in the path rule database 1231 connected to the path planner module 1230 in a form of a table. For example, the path planner module 1230 may transfer, to the natural language understanding module 1220, the path rule set corresponding to information (e.g., OS information, app information) about the user terminal 1100 received from the intelligence agent 1145. The table stored in the path rule database 1231, for example, may be stored for each domain or each version of a domain.

According to an embodiment, the path planner module 1230 may select one path rule or a plurality of path rules from the path rule set and may transfer the selected path rule or path rules to the natural language understanding module 1220. For example, the path planner module 1230 may select one path rule or a plurality of path rules by matching the parameter and the intent of the user to the path rule set corresponding to the user terminal 1100 and may transfer the selected path rule or path rules to the natural language understanding module 1220.

According to an embodiment, the path planner module 1230 may generate one path rule or a plurality of path rules using the parameter and the intent of the user. For example, the path planner module 1230 may generate one path rule or a plurality of path rules by determining an app to be executed and an action to be executed in the app based on the parameter and the intent of the user. According to an embodiment, the path planner module 1230 may store the generated path rule in the path rule database 1231.

According to an embodiment, the path planner module 1230 may store, in the path rule database 1231, a path rule generated by the natural language understanding module 1220. The generated path rule may be added to the path rule set stored in the path rule database 1231.

According to an embodiment, the table stored in the path rule database 1231 may include a plurality of path rules or a plurality of path rule sets. The plurality of path rules or the plurality of path rule sets may reflect the type, version, or characteristic of a device which performs each path rule.

According to an embodiment, the dialogue manager module 1240 may determine whether the intent of the user recognized by the natural language understanding module 1220 is clear. For example, the dialogue manager module 1240 may determine whether the intent of the user is clear based on whether information about a parameter is sufficient. The dialogue manager module 1240 may determine whether a parameter recognized by the natural language understanding module 1220 is sufficient for performing a task. According to an embodiment, when the intent of the user is not clear, the dialogue manager module 1240 may perform feedback for requesting required information from the user. For example, the dialogue manager module 1240 may perform feedback for requesting information about a parameter for recognizing the intent of the user.

According to an embodiment, the dialogue manager module 1240 may include a content provider module. When the content provider module is capable of performing an operation based on the parameter and the intent recognized by the natural language understanding module 1220, the content provider module may generate a result of performing a task corresponding to the user input. According to an embodiment, the dialog manager module 1240 may transmit the result generated by the content provider module to the user equipment 1100 as a response to the user input.

According to an embodiment, the natural language generator (NLG) module 1250 may change designated information into a text form. The information changed into a text form may have a form of a natural language utterance. The designated information may be, for example, information about an additional input, information notifying completion of an operation corresponding to a user input, or information for guiding the user to provide an additional input (e.g., feedback information for a user input). The information changed into a text form may be transmitted to the user terminal 1100 so as to be displayed on the display 1120, or may be transmitted to the text-to-speech module 1260 so as to be changed into a voice form.

According to an embodiment, the text-to-speech module 1260 may change text-form information into voice-form information. The text-to-speech module 1260 may receive text-form information from the natural language generator module 1250, and may change the text-form information into voice-form information to transmit the voice-form information to the user terminal 1100. The user terminal 1100 may output the voice-form information to the speaker 1130.

According to an embodiment, the natural language understanding module 1220, the path planner module 1230, and the dialogue manager module 1240 may be implemented as a single module. For example, the natural language understanding module 1220, the path planner module 1230, and the dialogue manager module 1240 may be implemented as a single module to determine the parameter and the intent of the user and generate a response (e.g., path rule) corresponding to the determined parameter and intent of the user. Accordingly, the generated response may be transmitted to the user terminal 1100.

Figure 17:
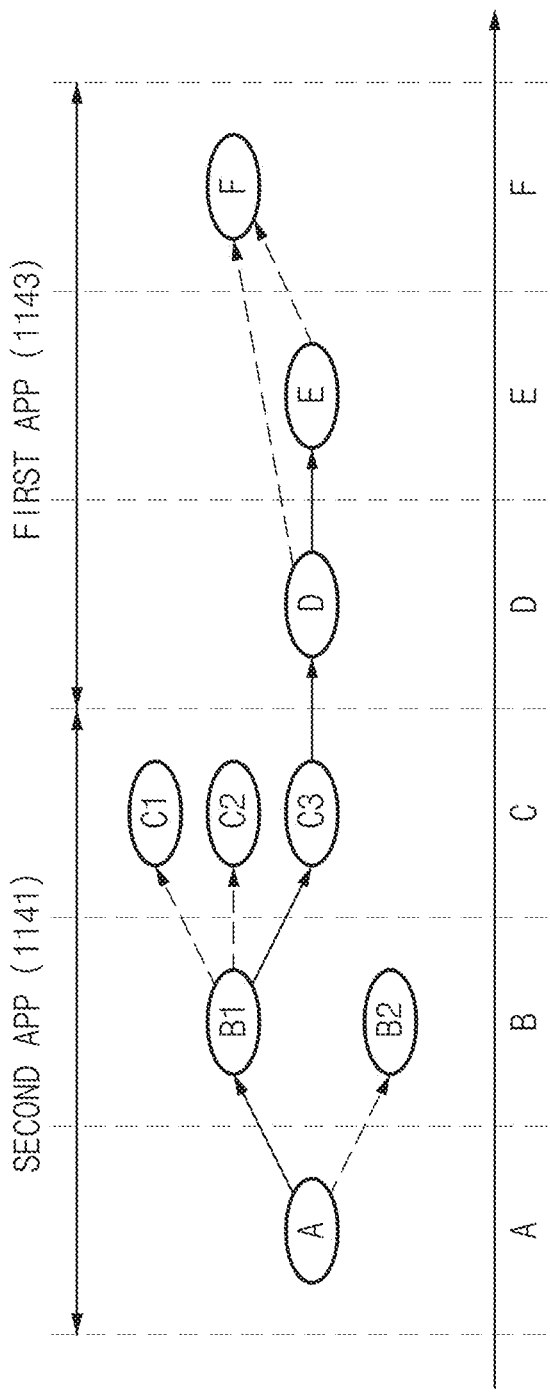
FIG. 17 is a diagram illustrating a method for a natural language understanding (NLU) module to generate a path rule.

FIG. 17 is a diagram illustrating a path rule generation method of a path planner module according to an embodiment of the present invention.

Referring to FIG. 17, the natural language understanding module 1220 according to an embodiment may classify a function of an app as one certain action (e.g., state A to state F) to store the function of the app in the path rule database 1231. For example, the natural language understanding module 1220 may store, in the path rule database 1231, a path rule set including a plurality of path rules (A-B1-C1, A-B1-C2, A-B1-C3-D-F, A-B1-C3-D-E-F) classified as one certain action (e.g., state).

According to an embodiment, the path rule database 1231 of the path planner module 1230 may store a path rule set for performing a function of an app. The path rule set may include a plurality of path rules including a plurality of actions (e.g., sequence of states). In the plurality of path rules, actions to be executed may be sequentially arranged according to parameters input to each of a plurality of actions. According to an embodiment, the plurality of path rules may be configured in the form of ontology or graph model so as to be stored in the path rule database 1231.

According to an embodiment, the natural language understanding module 1220 may select an optimum path rule (A-B1-C3-D-F) from among the plurality of path rules (A-B1-C1, A-B1-C2, A-B1-C3-D-F, A-B1-C3-D-E-F) corresponding to the parameter and the intent of the user input.

According to an embodiment, when there is no path rule exactly matching the user input, the natural language understanding module 1220 may transfer a plurality of rules to the user terminal 1100. For example, the natural language understanding module 1220 may select a path rule (e.g., A-B1) that partially corresponds to the user input. The natural language understanding module 1220 may select one or more path rules (e.g., A-B1-C1, A-B1-C2, A-B1-C3-D-F, A-B1-C3-D-E-F) including the path rule (e.g., A-B1) that partially corresponds to the user input, and may transfer the selected one or more path rules to the user terminal 1100.

According to an embodiment, the natural language understanding module 1220 may select one of the plurality of path rules based on an additional input of the user terminal 1100, and may transfer the selected path rule to the user terminal 1100. For example, the natural language understanding module 1220 may select one path rule (e.g., A-B1-C3-D-F) from among the plurality of path rules (e.g., A-B1-C1, A-B1-C2, A-B1-C3-D-F, A-B1-C3-D-E-F) according to a user input (e.g., input for selecting C3) additionally input to the user terminal 1100, and may transmit the selected path rule to the user terminal 1100.

According to another embodiment, the natural language understanding module 1220 may determine the parameter and the intent of the user corresponding to the user input (e.g., input for selecting C3) additionally input to the user terminal 1100 through the natural language understanding module 1220, and may transmit the determined parameter or intent of the user to the user terminal 1100. The user terminal 1100 may determine one path rule (e.g., A-B1-C3-D-F) from among the plurality of path rules (A-B1-C1, A-B1-C2, A-B1-C3-D-F, A-B1-C3-D-E-F) based on the transmitted parameter or intent.

Accordingly, the user terminal 1100 may complete action of the plurality of apps 1141 and 1143 through the selected one path rule.

According to an embodiment, when a user input having insufficient information is received by the intelligence server 1200, the natural language understanding module 1220 may generate a path rule partially corresponding to the received user input. For example, the natural language understanding module 1220 may transmit the partially corresponding path rule to the intelligence agent 1145. The processor 1150 may execute the intelligence agent 1145 to receive the path rule and transfer the partially corresponding path rule to the execution manager module 1147. The processor 1150 may execute the first app 1141 according to the path rule through the execution manager module 1147. While executing the first app 1141 through the execution manager module 1147, the processor 1150 may transfer information about an insufficient parameter to the intelligence agent 1145. The processor 1150 may request the user to provide an additional input using the information about an insufficient parameter through the intelligence agent 1145. When the additional input is received from the user through the intelligence agent 1145, the processor 1150 may transmit the user input to the intelligence server 1200 to process the user input. The natural language understanding module 1220 may generate an additional path rule based on intent and parameter information of the additionally input user input, and may transmit the path rule to the intelligence agent 1145. The processor 1150 may transmit the path rule to the execution manager module 1147 through the intelligence agent 1145 to execute the second app 1143.

According to an embodiment, when a user input lacking partial information is received by the intelligence server 1200, the natural language understanding module 1220 may transmit a user information request to the personal information server 1300. The personal information server 1300 may transmit, to the natural language understanding module 1220, information about the user who has input the user input stored in a persona database. The natural language understanding module 1220 may use the user information to select a path rule corresponding to the user input lacking a partial action. Accordingly, even if a user input lacking partial information is received by the intelligence server 1200, the natural language understanding module 1220 may receive an additional input by requesting missing information or may determine a path rule corresponding to the user input by using the user information.

Following Table 1 may show an example form of a path rule related to a task requested by a user according to an embodiment.

TABLE 1

| Path rule ID | State | parameter |
|---|---|---|
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule generated or selected by an intelligence server (the intelligence server of FIG. 11) in response to a user utterance (e.g., "share the picture") may include at least one state (25, 26, 27, 28, 29, or 30). For example, the at least one state (e.g., any one operation state of a terminal) may correspond to at least one of picture application execution (PicturesView) (25), picture search function execution (Search View) (26), output of a search result display screen (Search ViewResult) (27), output of a display screen of a search result in which a picture is non-selected (SearchEmptySelectedView) (28), output of a display screen of a search result in which at least one picture is selected (SearchSelectedView) (29), or shared application selection screen output (CrossShare) (30).

In an embodiment, parameter information of the path rule may correspond to at least one state. For example, the parameter information may be included in the state of the output of a display screen of a search result in which at least one picture is selected (29).

As a result of executing the path rule including a sequence of the states 25, 26, 27, 28, and 29, the task (e.g., "share the picture!") requested by the user may be executed.

Figure 18:
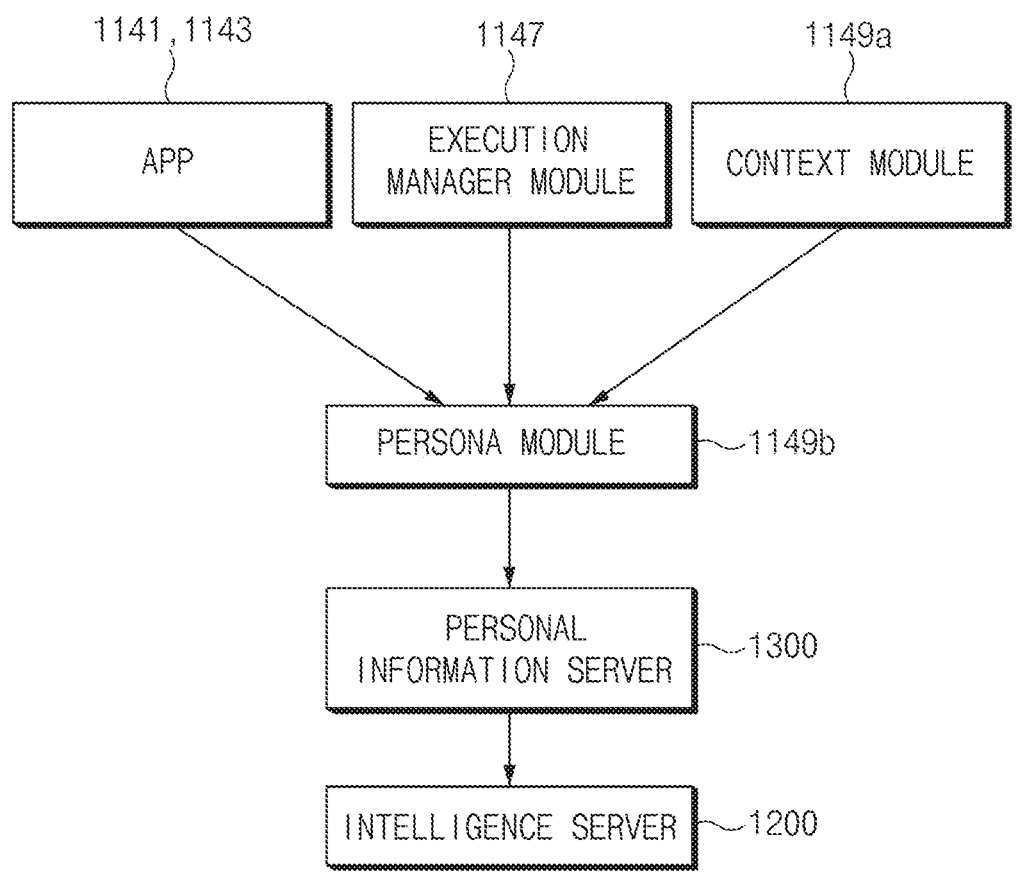
FIG. 18 is a diagram illustrating that a persona module of an intelligence service module according to an embodiment manages user information.

FIG. 18 is a diagram illustrating that a persona module of an intelligence service module according to an embodiment of the present invention manages user information.

Referring to FIG. 18, the processor 1150 may receive information about the user terminal 1100 from the plurality of apps 1141 and 1143, the execution manager module 1147, or the context module 1149a via the persona module 1149b. The processor 1150 may store, in an action log database, information about a result of execution of the actions 1141*b* and 1143*b* of apps through the plurality of apps 1141 and 1143 and the execution manager module 1147. The processor 1150 may store information about the current state of the user terminal 1100 in a context database through the context module 1149*a*. The processor 1150 may receive the stored information from the action log database or the context database through the persona module 1149*b*. Data stored in the action log database and the context database may be analyzed by, for example, an analysis engine, and transferred to the persona module 1149*b*.

According to an embodiment, the processor 1150 may transmit, to the suggestion module 1149*c*, the information received from the plurality of apps 1141 and 1143, the execution manager module 1147, or the context module 1149*a* via the persona module 1149*b*. For example, the processor 1150 may transfer, to the suggestion module 1149*c*, the data stored in the action log database or the context database through the persona module 1149*b*.

According to an embodiment, the processor 1150 may transmit, to the personal information server 1300, the information received from the plurality of apps 1141 and 1143, the execution manager module 1147, or the context module 1149*a* via the persona module 1149*b*. For example, the processor 1150 may periodically transmit, to the personal information server 1300, the data accumulated and stored in the action log database or the context database via the persona module 1149*b*.

According to an embodiment, the processor 1150 may transfer, to the suggestion module 1149*c*, the data stored in the action log database or the context database through the persona module 1149*b*. User information generated through the persona module 1149*b* may be stored in the persona database. The persona module 1149*b* may periodically transmit the user information stored in the persona database to the personal information server 1300. According to an embodiment, the information transmitted to the personal information server 1300 through the persona module 1149*b* may be stored in a persona database. The personal information server 1300 may deduce user information required for generating a path rule of the intelligence server 1200 using the information stored in the persona database.

According to an embodiment, the user information deduced using the information transmitted through the persona module 1149*b* may include profile information or preference information. The profile information or the preference information may be deduced from a user account and accumulated information.

The profile information may include personal information about a user. For example, the profile information may include population statistics information about users. The population statistics information may include, for example, gender or age of users. For another example, the profile information may include life event information. The life event information, for example, may be deduced by comparing log information with a life event model, and may be supplemented by analyzing behavior pattern. For another example, the profile information may include interest information. The interest information may include, for example, shopping articles of interest or fields of interest (e.g., sports or politics). For another example, the profile information may include activity area information. The activity area information may include, for example, information about a home or workplace. The activity area information may include not only information about the location of a place but also information about areas having priorities recorded based on a stay time and the number of visits. For another example, the profile information may include activity time information. The activity time information may include, for example, information about a wake-up time, commuting time, or sleeping time. The information about a commuting time may be deduced using the activity area information (e.g., information about a home or workplace). The information about a sleeping time may be deduced from a non-use time of the user terminal 1100.

The preference information may include information about preference of a user. For example, the preference information may include information about preference for an app. The preference for an app may be deduced from, for example, an app usage history (e.g., usage history for each time or place). The preference for an app may be used to determine an app to be executed according to a current state (e.g., time, place) of the user. For another example, the preference information may include information about preference for contact information. The preference for contact information, for example, may be deduced by analyzing a frequency of contact (e.g., contact frequency for each time or place) through the contact information. The preference for contact information may be used to determine contact information to be contacted according to a current state (e.g., contact for identical names) of the user. For another example, the reference information may include setting information. The setting information may be deduced by analyzing information about a setting frequency (e.g., frequency of setting a setting value for each time or place) of a specific setting value. The setting information may be used for setting a specific setting value according to a current state (e.g., time, place, situation) of the user. For another example, the reference information may include place preference. The place reference, for example, may be deduced from a visit history of a specific place (e.g., visit history for each time). The place preference may be used to determine a place being visited according to a current state (e.g., time) of the user. For another example, the reference information may include command preference. The command preference, for example, may be deduced from a command usage frequency (e.g., usage frequency for each time or place). The command preference may be used to determine a command pattern to be used according to a current state (e.g., time, place) of the user. In particular, the command preference may include information about a menu which has been most frequency selected by the user in a current state of a running app by analyzing log information.

The electronic device 101 according to an embodiment may include the display 160, the input device 150 including the microphone 111, the communication circuit 190, the EM sensing circuit 200 for receiving the electromagnetic (EM) signal EM1 or EM2 of at least one external electronic device 201 and 202, and the processor 120 operationally connected to the display 160, the input device 150, the communication circuit 190, and the EM sensing circuit 200, wherein the processor 120 may be configured to obtain a voice input of a user through the microphone 111, transmit first information about the EM signal received by the EM sensing circuit 200 to a first server (e.g., the EM server 205 of FIG. 2) via the communication circuit 190, receive, from the first server, second information specifying a target device (e.g., the first external electronic device 201) among the at least one external electronic device 201 and 202 via the communication circuit 190 in response to transmission of the first information, and transmit voice data based on the voice input and the second information to a second server (e.g., the intelligence server 206 of FIG. 2) via the communication circuit 190 so that the target device operates in response to the voice input, wherein the electronic device 101 and the target device may be registered with the same user account in the second server, and the electronic device 101 may receive a path rule from the second server and may control the target device so that the target device operates based on the path rule.

The electronic device 101 according to an embodiment may receive, from the second server, a sequence of states generated based on the voice data and the second information via the communication circuit 190 in response to transmission of the voice data and the second information to the second server (e.g., operation 901 of FIG. 9), may establish, at least partially based on the sequence of states, a communication connection between the electronic device 101 and the target device (e.g., the first external electronic device 201 of FIG. 9) via the communication circuit 190 (e.g., operation 902 of FIG. 9), and may transmit a portion of the sequence of states to the target device (e.g., operation 903 of FIG. 9).

The sequence of states of the electronic device 101 according to an embodiment may determine an operation order of the target device.

The sequence of states of the electronic device 101 according to an embodiment may be a predetermined action providable by an intelligence app (e.g., an intelligence app associated with the intelligence agent 1145 of FIG. 12) of the electronic device 101, and may include a rule for entering a first state in which the voice input of the user is prepared and a rule for progressing to a second state different from the first state.

The electronic device 101 according to an embodiment may transfer the first information to the first server or compare the first information with a plurality of EM signals stored in the electronic device to identify a type and model name of an external electronic device that has emitted the EM signal.

The EM sensing circuit 200 according to an embodiment may include the band pass filter 220 for passing an EM signal of a reference frequency (e.g., 1 MHz) or lower in the EM signal, and the MCU 250 for comparing a maximum amplitude of the EM signal and a waveform of the EM signal with a plurality of waveforms stored in a waveform table.

The EM sensing circuit 200 according to an embodiment may supply the received EM signal to the processor 120, and the target device may be specified by comparing the EM signal with a plurality of pre-stored EM signals.

The EM sensing circuit 200 according to an embodiment may activate a sensing function when the at least one external electronic device 201 and 202 is not specified in the voice input.

The electronic device 101 according to an embodiment may make the target device operate based on the voice input when being tagged close to the target device.

The electronic device 101 according to an embodiment may specify the at least one external electronic device as the target device when the at least one external electronic device is arranged within a fixed distance using short-range communication (e.g., Bluetooth, WiFi direct, IrDA, NFC, BLE, WiFi, or NAN).

The electronic device 101 according to an embodiment may include the communication circuit 190, the memory 130, the processor 120 operationally connected to the communication circuit 190 and the memory 130, and the EM sensing circuit 200 for receiving an EM signal EM1 or EM2 from at least one external electronic device 201 and 202, wherein, when the memory 130 is executed, the processor 120 may be connected to the automatic speech recognition (ASR) module 1210 and a plurality of natural language understanding (NLU) modules 1220 operating independent of each other, may receive a voice input including an utterance of a user via the communication circuit, may provide the voice input to the automatic speech recognition module 1210, and may receive a response corresponding to contents of the voice input using any one of the plurality of natural language understanding modules 1220, and wherein the processor 120 may be configured to transmit, to at least one server (e.g., the EM server 205), information specifying a target device (e.g., the first external electronic device 201) among the at least one external electronic device using the EM signal received by the EM sensing circuit 200 via the communication circuit 190, and transmit, to another server (e.g., the intelligence server 206) different from the at least one server, information inducing the target device to operate based on the voice input via the communication circuit 190, wherein the electronic device 101 and the target device may be registered with the same user account in the at least one server, and the electronic device 101 may receive a path rule from the other server and may control the target device so that the target device operates based on the path rule.

The processor 120 according to an embodiment may be configured to transmit first information about the EM signal received by the EM sensing circuit 200 to a first server (e.g., the EM server 205 of FIG. 2) via the communication circuit 190, receive, from the first server, second information specifying the target device via the communication circuit 190 in response to transmission of the first information, and transmit at least a portion of voice data based on the voice input and the second information to a second server (e.g., the voice analysis server 206 of FIG. 2) via the communication circuit 190 so that the target device operates in response to the voice input.

The electronic device 101 according to an embodiment may receive, from the second server, a sequence of states generated based on the voice data and the second information via the communication circuit 190 in response to transmission of the voice data and the second information to the second server (e.g., operation 901 of FIG. 9), may establish, at least partially based on the sequence of states, a communication connection between the electronic device and the target device via the communication circuit (e.g., operation 902 of FIG. 9), and may transmit a portion of the sequence of states to the target device (e.g., operation 903 of FIG. 9).

The processor 120 according to an embodiment may generate supplemental text data (e.g., notebook computer) including type and model information about the at least one external electronic device using the first information, and may combine the supplemental text data with the text data (e.g., "transfer the picture here") (e.g., "transfer the picture to the notebook computer").

The EM sensing circuit 200 according to an embodiment may activate a sensing function when the processor 120 is connected to the automatic speech recognition module 1210 and the plurality of natural language understanding modules 1220.

A method for the electronic device 101 to control an external electronic device (e.g., the first external electronic device 201) according to an embodiment may include obtaining a voice input of a user through the microphone 111 (e.g., operation 701 of FIG. 7), receiving an electromagnetic (EM) signal of at least one external electronic device via the EM sensing circuit 200 (e.g., operation 703 of FIG. 7), transmitting first information about the EM signal to a first server (e.g., the EM server 205) via the communication circuit 190 (e.g., operation 705 of FIG. 7), receiving, from the first server, second information specifying a target device (e.g., the first external electronic device 201) among the at least one external electronic device via the communication circuit 190 in response to transmission of the first information (e.g., operation 707 of FIG. 7), and transmitting voice data based on the voice input and the second information to a second server (e.g., the intelligence server 206) via the communication circuit 190 so that the target device operates in response to the voice input, wherein the electronic device 101 and the target device may be registered with the same user account in the second server, and the electronic device 101 may receive a path rule from the second server and may control the target device so that the target device operates based on the path rule.

The receiving of the EM signal by the electronic device 101 (e.g., operation 703 of FIG. 7) may be performed when the target device is not specified in the voice input (e.g., "transfer the picture here").

The method for the electronic device 101 to control an external electronic device according to an embodiment may further include receiving, from the second server, a sequence of states generated based on the voice data and the second information via the communication circuit 190 in response to transmission of the voice data and the second information to the second server (e.g., operation 901 of FIG. 9), establishing, at least partially based on the sequence of states, a communication connection between the electronic device 101 and the target device via the communication circuit 190 (e.g., operation 902 of FIG. 9), and transmitting a portion of the sequence of states to the target device (e.g., operation 903 of FIG. 9).

The first server according to an embodiment may generate the second information by analyzing (e.g., the analysis unit 121 of FIG. 2A) the first information by using information related to the EM signal of the at least one external electronic device.

The method for the electronic device 101 to control an external electronic device according to an embodiment may further include detecting external electronic devices capable of executing contents of the voice input among the at least one external electronic device (e.g., detecting a device capable of receiving a picture).

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   an electromagnetic (EM) sensing circuit for receiving an EM signal;
   memory; and
   a processor operationally connected to the EM sensing circuit and the memory,
   wherein the processor is configured to:
      obtain a user input,
      specify a target device,
      transmit input data based on the user input and information about the target device to an intelligence server so that the target device operates in response to the user input, and
      control the target device based on a path rule received from the intelligence server,
   wherein the processor is further configured to specify the target device based on the user input, if the user input is obtained before the specifying the target device, and if the user input contains words associated with the target device,
   wherein the processor is further configured to specify the target device by:
      activating, if the user input is obtained before the specifying the target device, and if the user input does not contain the words associated with the target device, the EM sensing circuit,
      receiving, based on the activation of the EM sensing circuit, an EM signal from an external electronic device which is tagged or brought closer,
      determining that the EM signal is corresponding to a pre-stored EM signal which is stored in the memory,
      specifying, based on the determination that the EM signal is corresponding to the pre-stored EM signal, the external electronic device using the pre-stored EM signal,
      transmitting, based on the determination that the EM signal is not corresponding to the pre-stored EM signal, the EM signal to an EM server, receiving data about the external electronic device from the EM server and specifying the external electronic device based on the receiving data, and
      recognizing the external electronic device as the target device, and
      wherein the processor is further configured to specify the target device when the electronic device is tagged close to the target device or when the target device is arranged within a fixed distance using short-range communication, if the user input is obtained after the specifying the target device.

2. The electronic device of claim 1, wherein the EM sensing circuit comprises:
   a band pass filter for passing an EM signal of a reference frequency or lower in the EM signal, and
   a microcontroller unit (MCU) for comparing a maximum amplitude of the EM signal and a waveform of the EM signal with a plurality of waveforms stored in a waveform table.

3. The electronic device of claim 1, wherein the processor is further configured to:
   receive, from the intelligence server, a sequence of states generated based on the input data and the information about the target device in response to transmission of the input data and the information about the target device to the intelligence server,
   establish, at least partially based on the sequence of states, a communication connection between the electronic device and the target device, and
   transmit a portion of the sequence of states to the target device.

4. The electronic device of claim 3, wherein the sequence of states determines an operation order of the target device.

5. The electronic device of claim 3, wherein the sequence of states is a predetermined action providable by an intelligence app of the electronic device, and includes a rule for entering a first state in which the user input of the user is prepared and a rule for progressing to a second state different from the first state.

6. A method for an electronic device to control a target device, the method comprising:
   obtaining an user input;
   specifying a target device;
   transmitting input data based on the user input and information about the target device to an intelligence server so that the target device operates in response to the user input; and
   controlling the target device based on a path rule received from the intelligence server,
   wherein the specifying the target device is based on the user input, if the user input is obtained before the specifying the target device, and if the user input contains words associated with the target device,
   wherein the specifying the target device comprises:
      activating, if the user input is obtained before the specifying the target device, and if the user input does not contain information specifying a target device, an EM sensing circuit;
      receiving, based on the activation of the EM sensing circuit, an EM signal from the target device;
      determining that the EM signal is the same as a pre-stored EM signal which is stored in the electronic device;
      specifying, based on the determination that the EM signal is the same as the pre-stored EM signal, the target device using the pre-stored EM signal;
      transmitting, based on the determination that the EM signal is different from the pre-stored EM signal, the EM signal to an EM server and specifying the target device based on receiving information associated with the target device from the EM server;
      transmitting input data based on the user input and the information associated with the target device, to an intelligence server so that the target device operates in response to the user input; and
      controlling the target device based on a path rule received from the intelligence server, and
   wherein the specifying the target device also comprises:
      being tagged close to the target device or arranging the target device within a fixed distance using short-range communication, if the user input is obtained after the specifying the target device.

7. The method of claim 6, further comprising:
   receiving, from the intelligence server, a sequence of states generated based on the input data and the information about the target device in response to transmission of the input data and the information about the target device to the intelligence server;

establishing, at least partially based on the sequence of states, a communication connection between the electronic device and the target device; and transmitting a portion of the sequence of states to the target device.

8. The method of claim 7, wherein the sequence of states determines an operation order of the target device.

9. The method of claim 7, wherein the sequence of states is a predetermined action providable by an intelligence app of the electronic device, and includes a rule for entering a first state in which the user input of the user is prepared and a rule for progressing to a second state different from the first state.

* * * * *